(12) United States Patent
Bruce-Wen et al.

(10) Patent No.: US 12,135,391 B2
(45) Date of Patent: Nov. 5, 2024

(54) SELF-DRIVING SENSOR SYSTEM

(71) Applicant: Waymo LLC, Mountain View, CA (US)

(72) Inventors: Yi-Hui Bruce-Wen, San Francisco, CA (US); YooJung Ahn, Mountain View, CA (US); Jared Gross, Belmont, CA (US); Joshua Newby, San Francisco, CA (US); Jerry Chen, San Francisco, CA (US); Ralph Shepard, Menlo Park, CA (US); Adam Brown, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 377 days.

(21) Appl. No.: 16/990,491

(22) Filed: Aug. 11, 2020

(65) Prior Publication Data

US 2021/0293932 A1 Sep. 23, 2021

Related U.S. Application Data

(63) Continuation-in-part of application No. 29/722,227, filed on Jan. 28, 2020, now Pat. No. Des. 950,404,
(Continued)

(51) Int. Cl.
*G01S 7/481* (2006.01)
*B60R 11/00* (2006.01)
(Continued)

(52) U.S. Cl.
CPC ............ *G01S 7/4813* (2013.01); *G01S 7/027* (2021.05); *G01S 7/4817* (2013.01);
(Continued)

(58) Field of Classification Search
CPC ...... G01S 7/027; G01S 7/4813; G01S 7/4817; G01S 7/52006; G01S 13/867;
(Continued)

(56) References Cited

U.S. PATENT DOCUMENTS

D328,436 S 8/1992 Fuerst et al.
5,945,907 A 8/1999 Yaron et al.
(Continued)

FOREIGN PATENT DOCUMENTS

CN 209064008 U 7/2019
DE 102017104988 A1 9/2017
(Continued)

OTHER PUBLICATIONS

PCT Search Report and Written Opinion in International Application No. PCT/US2020/043068, malled Oct. 15, 2020.
(Continued)

*Primary Examiner* — Yuqing Xiao
*Assistant Examiner* — Benjamin Richard Hebert
(74) *Attorney, Agent, or Firm* — Botus Churchill IP LAW LLP

(57) ABSTRACT

The technology employs a contrasting color scheme on different surfaces for sensor housing assemblies mounted on exterior parts of a vehicle that is configured to operate in an autonomous driving mode. Lighter and darker colors may be chosen on different surfaces according to a thermal budget for a given sensor housing assembly, due to the different types of sensors arranged along particular surfaces, or to provide color contrast for different regions of the assembly. For instance, differing colors such as black/white or blue/white, and different finishes such as matte or glossy, may be selected to enhance certain attributes or to minimize issues associated with a sensor housing assembly.

1 Claim, 27 Drawing Sheets

Related U.S. Application Data which is a continuation-in-part of application No. 29/689,690, filed on May 1, 2019, now Pat. No. Des. 915,913, which is a continuation-in-part of application No. 29/680,845, filed on Feb. 20, 2019, now Pat. No. Des. 902,756.

(51) Int. Cl.

| | | |
|---|---|---|
| *B60R 11/04* | (2006.01) | |
| *G01S 7/02* | (2006.01) | |
| *G01S 7/52* | (2006.01) | |
| *G01S 13/86* | (2006.01) | |
| *G01S 13/931* | (2020.01) | |
| *G01S 15/931* | (2020.01) | |
| *G01S 17/08* | (2006.01) | |
| *G01S 17/931* | (2020.01) | |

(52) U.S. Cl.
CPC ........ *G01S 7/52006* (2013.01); *G01S 13/867* (2013.01); *G01S 13/931* (2013.01); *G01S 15/931* (2013.01); *G01S 17/08* (2013.01); *G01S 17/931* (2020.01); *B60R 2011/0049* (2013.01); *B60R 11/04* (2013.01); *G01S 2013/93273* (2020.01); *G01S 2015/937* (2013.01)

(58) Field of Classification Search
CPC ...... G01S 13/931; G01S 15/931; G01S 17/08; G01S 17/931; G01S 2015/937; G01S 2013/93273; B60R 11/04; B60R 2011/004; B60R 2011/0049
See application file for complete search history.

(56) References Cited

U.S. PATENT DOCUMENTS

| | | |
|---|---|---|
| D478,518 S | 8/2003 | Porter |
| D525,888 S | 8/2006 | Porter |
| D563,246 S | 3/2008 | Ishii et al. |
| 7,517,099 B2 | 4/2009 | Hannah |
| D717,720 S | 11/2014 | Marino |
| D734,211 S | 7/2015 | Ahn et al. |
| D739,336 S | 9/2015 | Berrey |
| 9,725,060 B1 | 8/2017 | Daniel et al. |
| 9,802,656 B1 | 10/2017 | Williams |
| 9,862,311 B2 | 1/2018 | Kiriyama et al. |
| D822,580 S | 7/2018 | Eriksson et al. |
| D835,028 S | 12/2018 | Ahn et al. |
| 10,302,744 B1 | 5/2019 | Krishnan et al. |
| 10,359,507 B2 | 7/2019 | Berger et al. |
| D866,368 S | 11/2019 | Ahn et al. |
| D874,956 S | 2/2020 | Ahn et al. |
| D878,264 S | 3/2020 | Ahn et al. |
| 2005/0046823 A1 | 3/2005 | Ando et al. |
| 2012/0325360 A1 | 12/2012 | McGrath et al. |
| 2014/0049912 A1 | 2/2014 | Marshall |
| 2015/0042797 A1* | 2/2015 | Alam ................ B60R 1/00 348/148 |
| 2015/0131080 A1* | 5/2015 | Retterath ............ G01S 7/4815 356/5.01 |
| 2015/0264230 A1* | 9/2015 | Takeda ................ G03B 17/12 348/95 |
| 2015/0274091 A1* | 10/2015 | Lang .................. B60R 21/01 348/148 |
| 2016/0006911 A1* | 1/2016 | Kimura ............... G03B 17/55 348/47 |
| 2016/0011594 A1 | 1/2016 | Chung et al. |
| 2017/0028936 A1* | 2/2017 | Matsumoto .......... G03B 17/08 |
| 2017/0151933 A1 | 6/2017 | Doorley et al. |
| 2017/0261273 A1 | 9/2017 | Maranville et al. |
| 2017/0293016 A1 | 10/2017 | McCloskey et al. |
| 2017/0300060 A1 | 10/2017 | Crawley |
| 2017/0343654 A1 | 11/2017 | Valois et al. |
| 2018/0011173 A1 | 1/2018 | Newman |
| 2018/0015886 A1 | 1/2018 | Frank et al. |
| 2018/0017680 A1 | 1/2018 | Pennecot et al. |
| 2018/0037268 A1 | 2/2018 | Moore et al. |
| 2018/0086280 A1* | 3/2018 | Nguyen ............... G01S 17/931 |
| 2018/0372875 A1* | 12/2018 | Juelsgaard ........... G01S 7/4815 |
| 2019/0003895 A1* | 1/2019 | Krishnan ............ G01K 13/02 |
| 2019/0204845 A1 | 7/2019 | Grossman et al. |
| 2019/0359147 A1* | 11/2019 | Zajac ................. B60R 11/04 |
| 2019/0377086 A1* | 12/2019 | Rogan .................. G01S 13/867 |
| 2020/0025933 A1 | 1/2020 | Ghannam et al. |
| 2020/0072947 A1* | 3/2020 | Miu ..................... G01S 13/931 |
| 2020/0300964 A1* | 9/2020 | Kasaba ................ G01S 17/931 |

FOREIGN PATENT DOCUMENTS

| | | |
|---|---|---|
| WO | WO-2017119385 A1 * | 7/2017 |
| WO | 2019059921 A1 | 3/2019 |

OTHER PUBLICATIONS

International Search Report and Written Opinion for Application No. PCT/US21/70952 dated Nov. 4, 2021 (7 pages).

\* cited by examiner

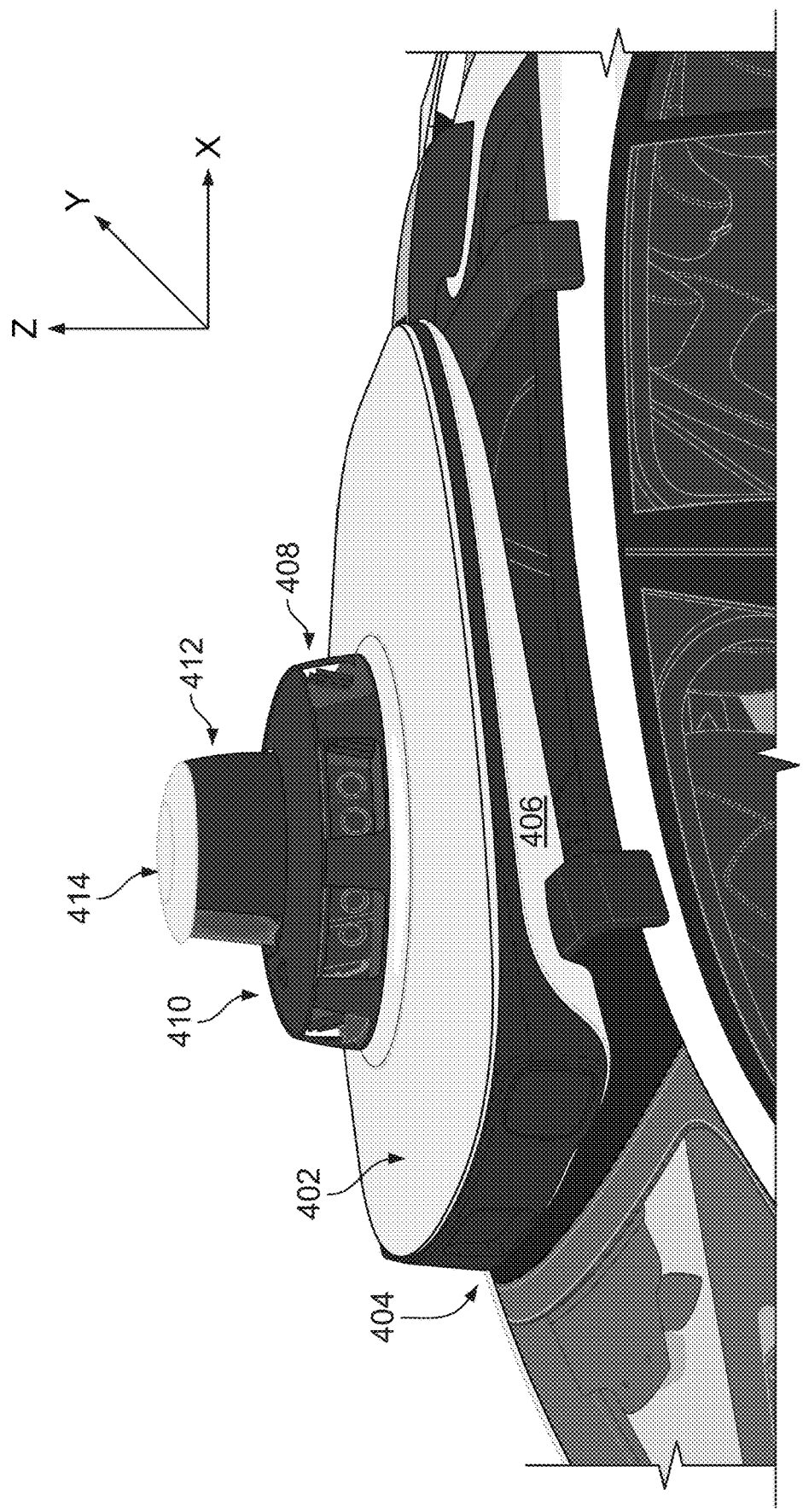

440

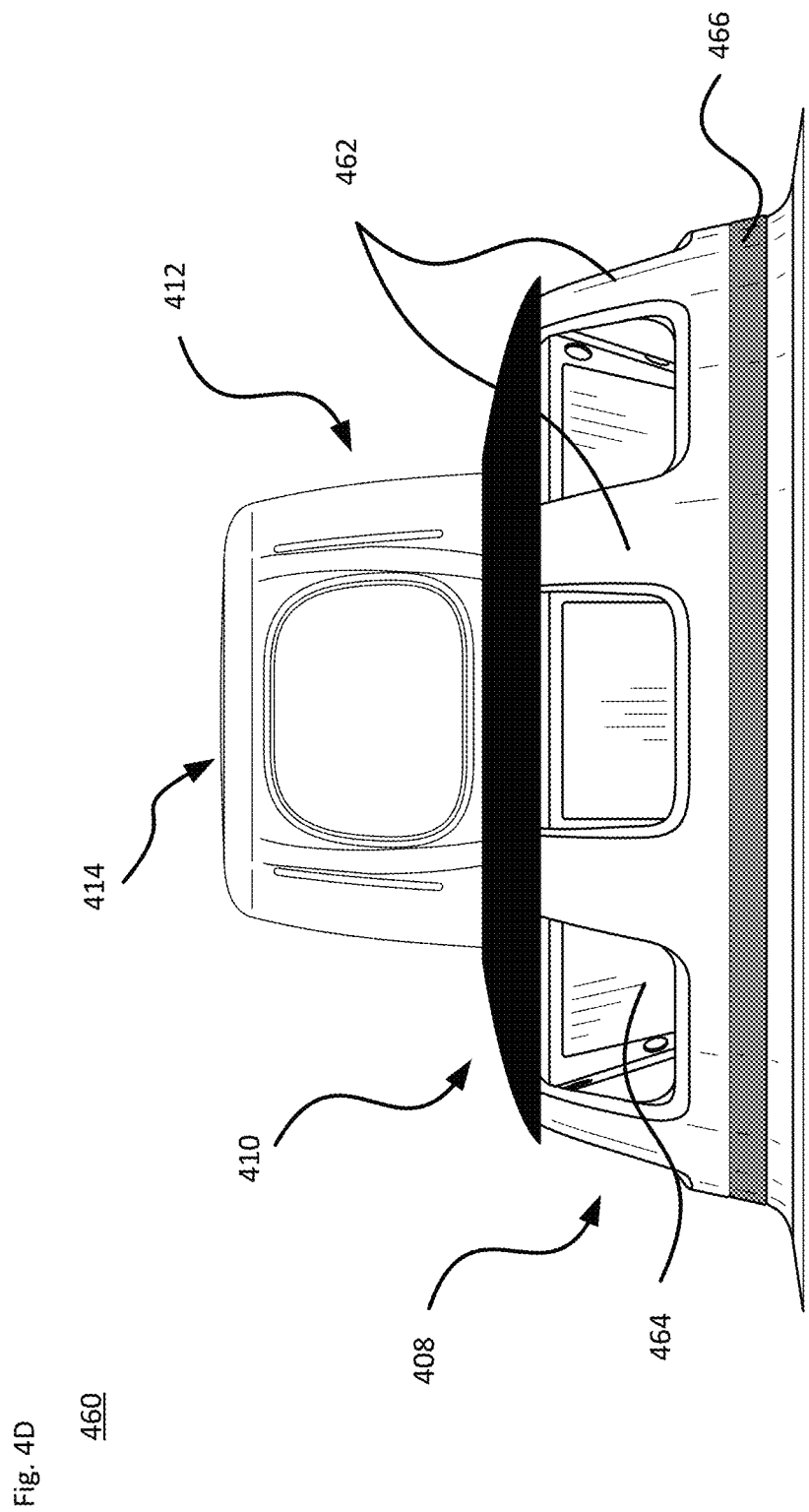

540

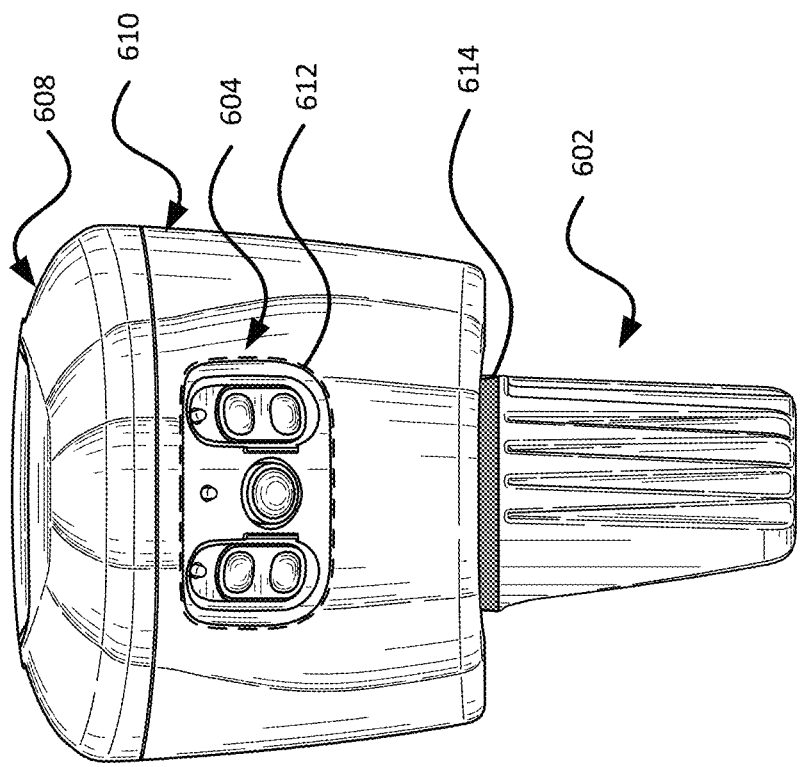
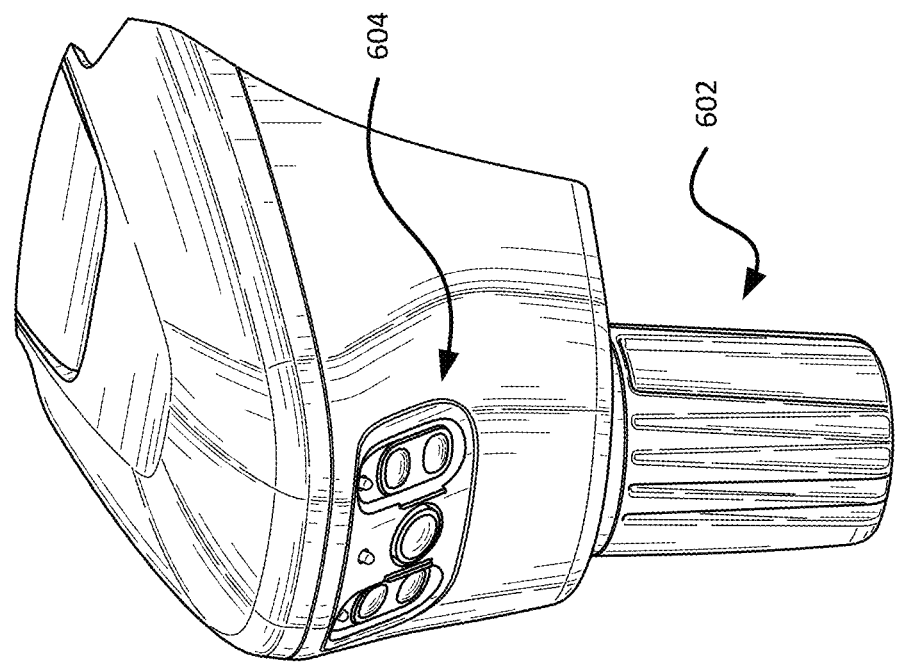

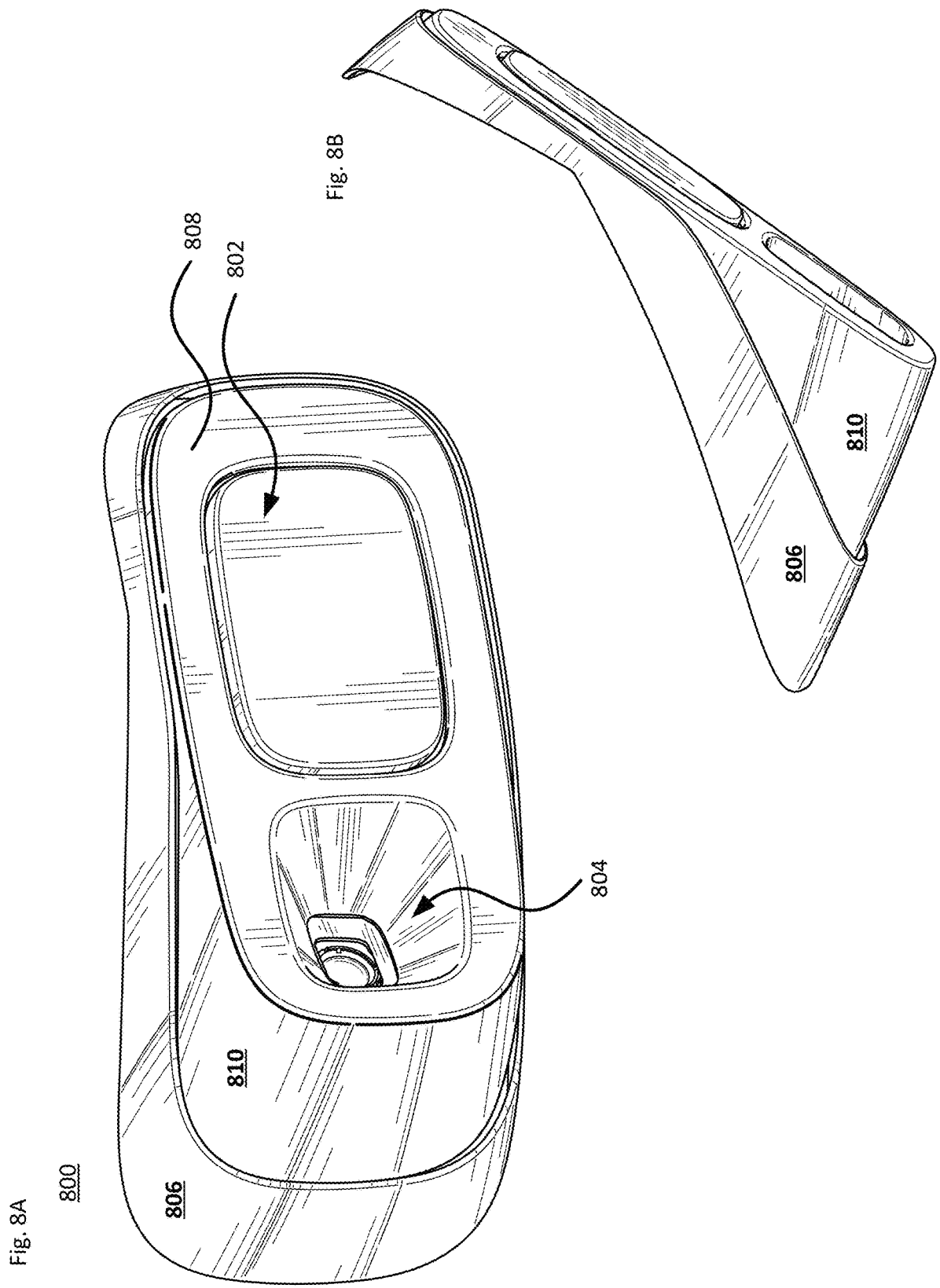

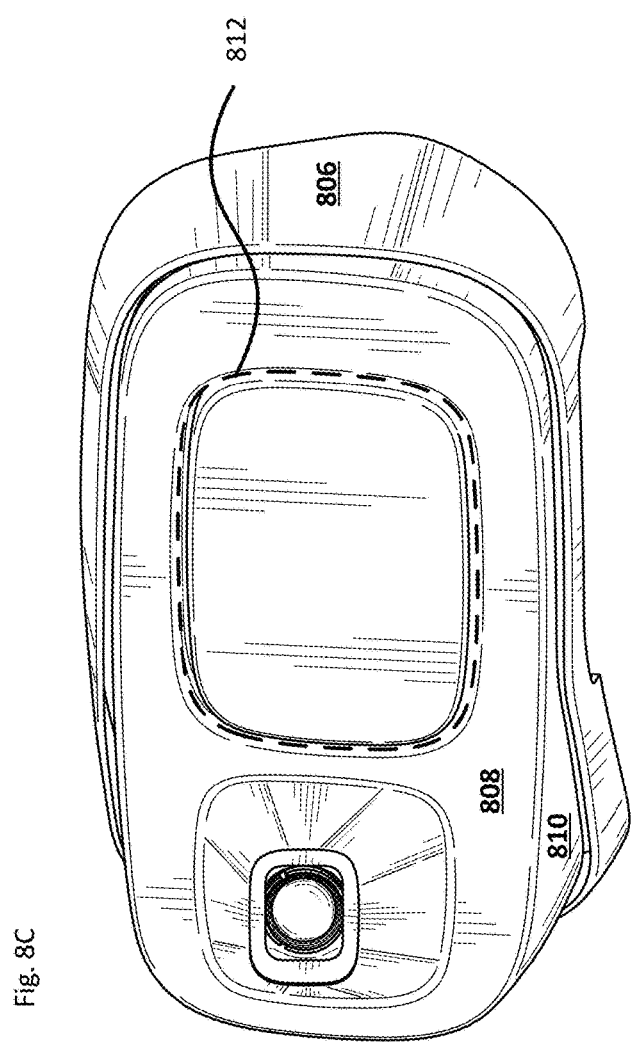
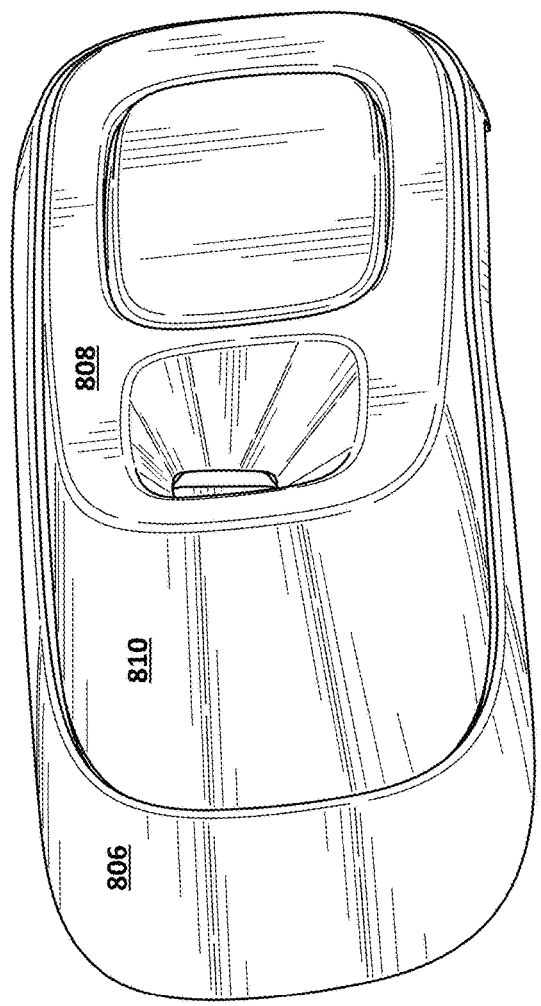

SELF-DRIVING SENSOR SYSTEM

CROSS-REFERENCE TO RELATED APPLICATIONS

This application is a continuation-in-part of U.S. Design application No. 29/680,845, filed Feb. 20, 2019, is a continuation-in-part of U.S. Design application No. 29/689,690, filed May 1, 2019, and is a continuation-in-part of U.S. Design application No. 29/722,227, filed Jan. 28, 2020, the entire disclosures of which are incorporated by reference herein. This application is related to U.S. Provisional Application No. 62/879,183, filed Jul. 26, 2019, the entire disclosure of which is incorporated by reference herein.

BACKGROUND

Sensor systems for vehicles may be located at different places about the vehicle, including on the roof and along perimeter sections of the chassis. However, depending on the type of sensor, its placement along the vehicle and its placement relative to other components, the sensor may be adversely affected by temperature changes, the amount of ambient light and other environmental issues. Should this occur, the sensor may not operate as intended, for instance by generating artifacts in the sensor data, overheating, or potentially by failing entirely.

BRIEF SUMMARY

The technology relates to using a contrasting color scheme on different surfaces for sensor housing assemblies mounted on exterior parts of a vehicle that is configured to operate in an autonomous driving mode. Different colors and surface types (e.g., matte or glossy) may be selected according to sensor type and placement. This can be done to illuminate glare, reduce reflections, and aid in thermal management in view of a thermal budget for a sensor unit or a sensor assembly that includes a variety of different types of sensors. From an aesthetic standpoint, color variations or patterns may include alternating bands of color as a contrast, such as to hide the visual complexity of an object (e.g., a sensor) or minimize certain visual aspects (e.g., parting lines, openings, components, etc.).

According to one aspect of the technology, a sensor housing is provided for use in a vehicle configured to operate in an autonomous driving mode. The sensor housing comprises a base section having a first side facing towards a roof of the vehicle and a second side opposite the first side, and an upper section disposed along the second side of the base section and extending away from the roof of the vehicle. The upper section has one or more surfaces generally parallel to the second side of the base section, and one or more surfaces generally perpendicular to the second side of the base section. The sensor housing further comprises a sensor module disposed along the upper section, wherein the sensor module is configured to detect objects or environmental conditions external to the vehicle. The second side of the base section has a first color. The one or more surfaces of the upper section generally parallel to the second side of the base section have the first color. And the one or more surfaces of the upper section generally perpendicular to the second side of the base section having a second color distinct from the first color.

In one example, the first color absorbs less heat than the second color, and the second color reflects less visible or near infrared light than the first color. The first color may be white and the second color may be black.

In another example, the upper section includes a first upper section disposed adjacent to the base section and a second upper section disposed remote from the base section. Here, a surface of the first upper section has the second color, and a surface of the second upper section has the first color. The surface of the first upper section having the second color may be black, and the surface of the second upper section having the first color may be white. The surface of the first upper section having the second color may have a matte finish to reduce reflections or to reduce stray visible or near infrared light into the sensor module.

In a further example, the sensor module is a first sensor module, and the sensor housing further includes a second sensor module disposed along the base section. In this case, the second sensor module includes a set of sensors arranged along one surface of the base section to detect objects or environmental conditions external to the vehicle along a particular side of the vehicle, and each sensor of the set of sensors has the second color. For instance, the set of sensors may include a plurality of cameras and the particular side may be a front side of the vehicle. Or, alternatively, the set of sensors includes one or more cameras and one or more radar sensors. The first or second color may be selected for at least one of the first and second sensor modules according to a type of sensor incorporated in the first or the second sensor module.

A plurality of generally vertical surfaces of the sensor housing may have the second color and a plurality of generally horizontal surfaces of the sensor housing may have the first color. At least one surface of the upper section generally parallel to the second side of the base section may have the second color. In this case, the at least one surface of the upper section generally parallel to the second side of the base section may include a thermal coating for temperature regulation of the sensor housing.

The first and second colors may be selected based on a thermal budget for the sensor housing. Here, the first and second colors may be further selected according to whether there is a cooling system of the sensor housing.

According to another aspect of the technology, a sensor housing is provided for use in a vehicle configured to operate in an autonomous driving mode. Here, the sensor housing comprises a first region arranged generally parallel to a side surface of the vehicle and one or more second regions. The first region includes at least a first sensor of a first type and a second sensor of a second type. The one or more second regions are generally orthogonal to the first region and do not include any sensors therealong. The first region has a first color, and at least one of the one or more second regions has a second color distinct from the first color.

In one example, the first region includes at least one camera and at least one radar sensor, the first color is a darker color on the order of L*24.48, a*0.24, b*−0.61 in the 0 color space, and the second color is a lighter color on the order of L*89.08, with a* being between −1.4 to −1.5 and b* being between −0.10-0.15 in the CIELAB color space.

In another example, the sensor housing further includes a third region adjacent to the first region and a fourth region adjacent to the first region and a given one of the second regions. The third region includes at least one sensor of the first type, and the fourth region includes a sensor of a third type. Here, the third region has the first color and the fourth region has the second color.

According to a further aspect of the technology, a vehicle comprises a control system having one or more processors configured to operate the vehicle in an autonomous driving mode based on objects and conditions in an environment external to the vehicle. The vehicle also includes a perception system operatively coupled to the control system. The perception system is configured to detect one or more of the objects and conditions in the environment external to the vehicle. The perception system includes any of the sensor housings described above, which may be disposed along a roof section of the vehicle or along a side quarterpanel of the vehicle.

BRIEF DESCRIPTION OF THE DRAWINGS

FIGS. 4A-F illustrate features of a roof sensor assembly in accordance with aspects of the technology.

FIGS. 6A-D illustrate features of a front perimeter sensor assembly in accordance with aspects of the technology.

FIGS. 8A-D illustrate aspects of rear perimeter sensor assembly in accordance with aspects of the technology.

DETAILED DESCRIPTION

Figure 1A:
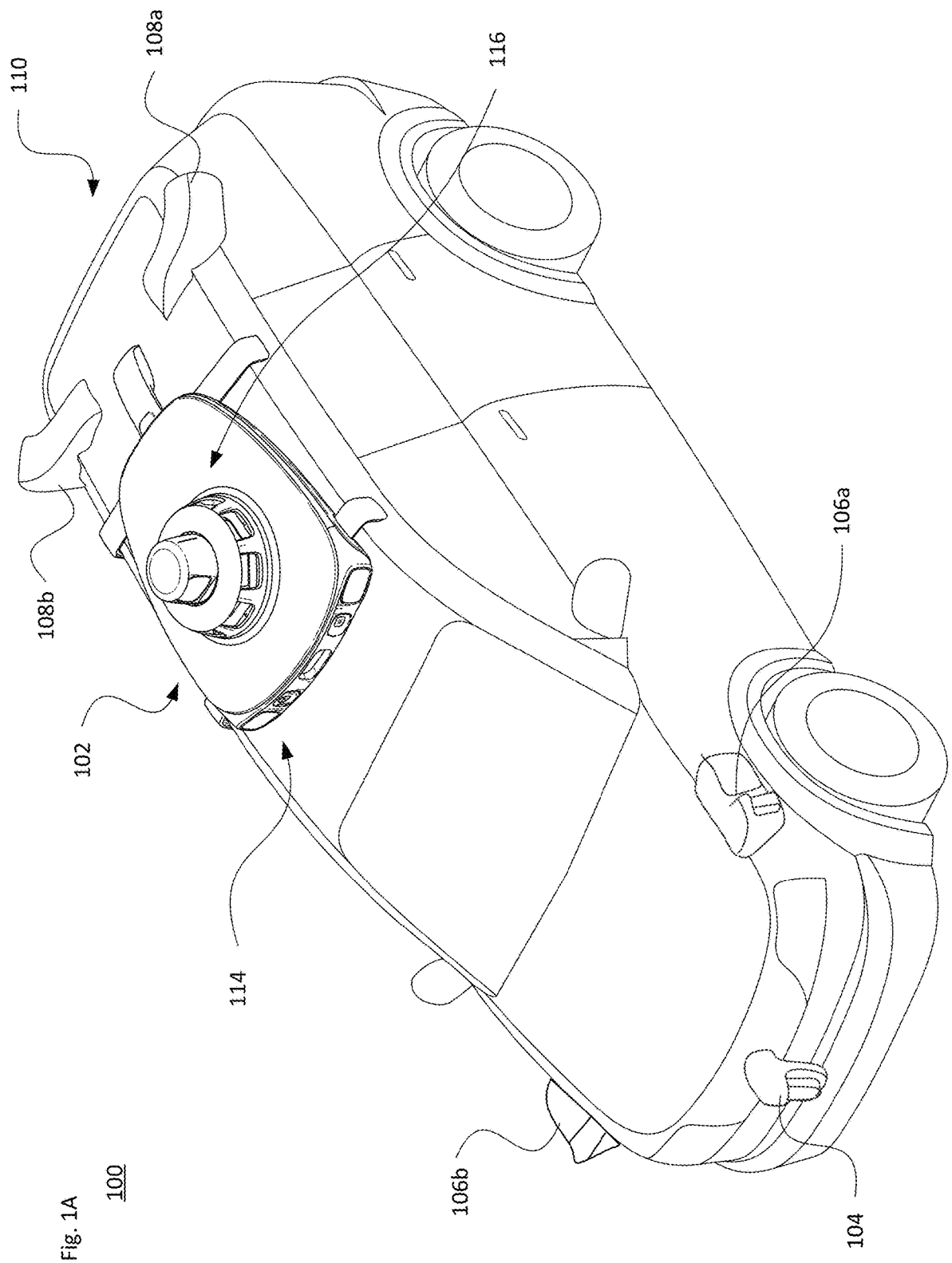
FIGS. 1A-C illustrate example vehicles with sensor assemblies in accordance with aspects of the technology.

According to aspects of the technology, different colors (e.g., black/white or blue/white) and different finishes (e.g., matte v. glossy) can be selected to enhance certain attributes or to minimize issues associated with a sensor housing assembly of a vehicle configured to operate in an autonomous driving mode. This can include thermal budget considerations associated with a particular sensor module or sensor suite within a larger housing assembly. It can also include aesthetic impact for selected assembly elements, such as adjacent surfaces.

The color selection can be especially important for a sensor suite located in a housing along the front, rear, side or roof of a vehicle. For instance, contrasting colors in, e.g., the CIELAB color space (CIE L*a*b*), can provide both a distinct appearance and can also help enhance operation of the system. By way of example, a pair of contrasting dark and light colors can be employed to reflect light and/or decrease heating along a first set of surfaces, while minimizing reflections along a second set of surfaces. For instance, the darker color(s) may be L*24.48, a*0.24, b*-0.61 or L*51.47, a*-5.95, b*-43.86 in the CIELAB color space, while the lighter color may be on the order of L*89.08, with a* being between -1.4 to -1.5 and b* being between -0.10-0.15. These values may be higher or lower, e.g., +/-10-15% for any L, a or b value. The amount of gloss (or matte) can vary depending upon the sensor housing surface and other factors. These and other features of the technology are discussed in detail below.

Each sensor assembly along exterior parts of the vehicle may have a thermal budget associated with it. Air circulation and active ventilation may be employed to help regulate the temperature, especially for larger sensor assemblies such as those mounted along the vehicle's roof. For instance, air inlets and air exhausts may be arranged along a base of a roof pod assembly, and one or more blowers/fans may be arranged to pull air through a ducting system within the assembly. In addition to providing ventilation along the base section of the roof pod assembly, one or more vents may also be located in the upper section of the assembly. The thermal analysis for a given sensor housing may provide a conservative estimate and identify a potential fail point, e.g., where the instantaneous temperature or average temperature for a given period of time would affect the operation or cause one or more sensors of the sensor assembly to fail. This can take into account different climates (e.g., the southwest desert v. the Pacific northwest), seasons (e.g., summer v. winter), time of day (e.g., noon v. midnight), humidity levels and other factors.

By way of example, there may be an electronics (e.g., PCB-level) thermal analysis via computer simulation, airflow simulation that may or may not be combined with solar load raytracing, component-level thermal tests (e.g., using a thermal chamber), and vehicle-level thermal tests, both in real world and in climatic wind tunnels. In some cases, a simulation alone may be enough to understand the thermal budget of a specific component. In other cases, such as when there is a variety of different physical effects involved (e.g., aerodynamics, solar load heat buildup and electronics producing heat), the thermal budget for a given enclosed sensor assembly may be accurately determined only after testing different configurations on a vehicle. In view of the thermal analysis and other factors, colors and surface properties for different areas of the sensor assembly can be selected.

Even if the thermal impact for a given sensor assembly may be determined to be low, the type(s) of sensors and potential issues created by glare, light reflections, infrared illumination and other factors may impact the selection of color and surface type.

Example Vehicle Systems

Figure 1B:
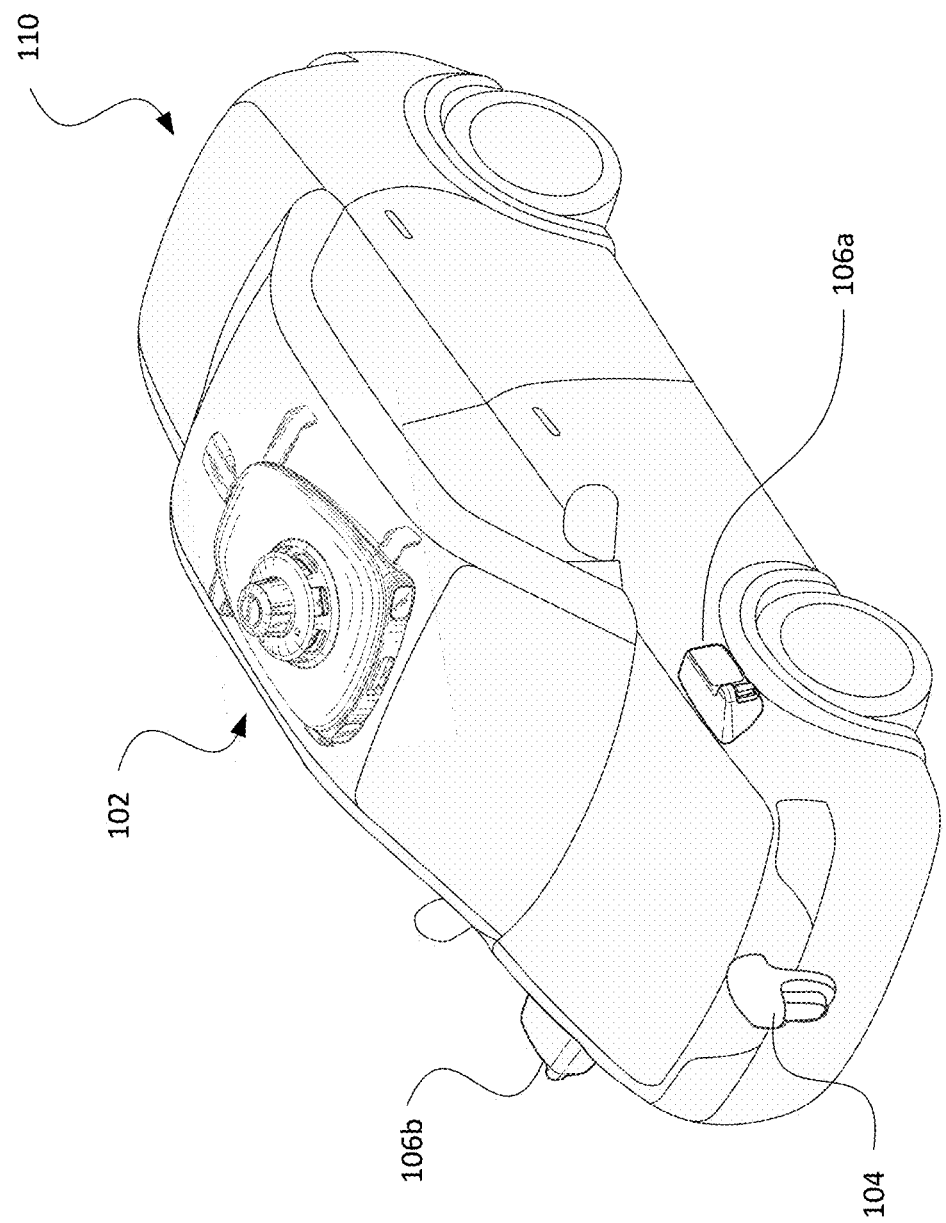
Figure 1C:
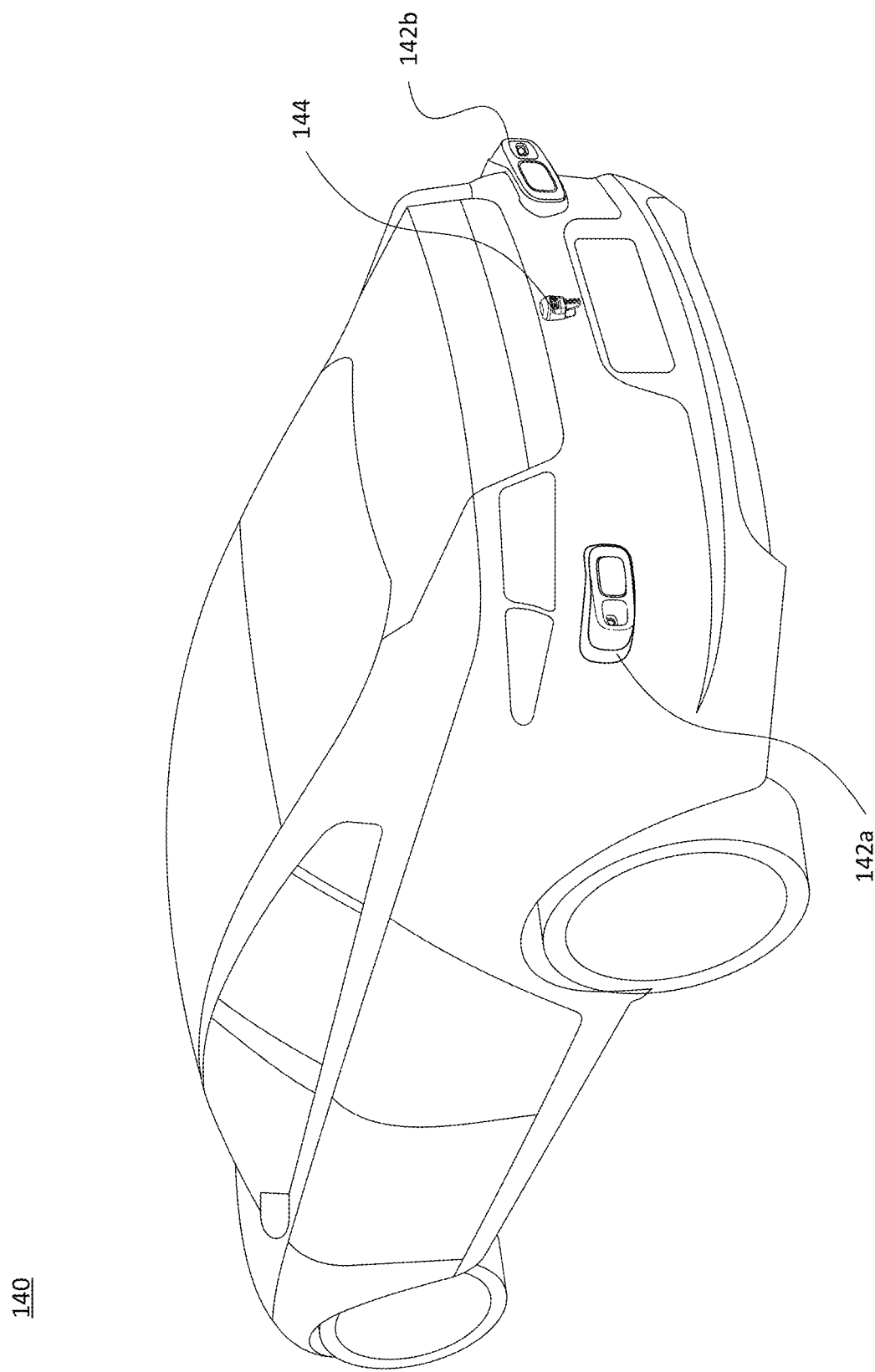

FIG. 1A illustrates a front perspective view of an example passenger vehicle 100, such as a minivan, sport utility vehicle (SUV) or other vehicle. FIG. 1B illustrates a front perspective view of another example passenger vehicle 120, such as a sedan. And FIG. 1C illustrates a rear perspective view of another example passenger vehicle 140.

The vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensor), inertial (e.g., accelerometer, gyroscope, etc.) and/or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown in FIGS. 1A and/or 1B, the passenger vehicle 100 also includes housings 108a, 108b for radar units, lidar and/or cameras also located towards the rear roof portion of the vehicle. Additional lidar, radar units and/or cameras may be located at other places along the vehicle 100. For instance, arrow 110 indicates that one or more sensor units may be positioned along the rear of the vehicle 100, such as on or adjacent to the bumper. This can be seen in FIG. 1C, where sensor housings 142a and 142b are arranged along the left and right sides of the bumper, while the assembly of sensor housing 144 is disposed centrally at the rear of the vehicle.

Returning to FIG. 1A, arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 120 of FIG. 1B.

By way of example, each sensor unit may include one or more sensors of the types described above, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicle including, but not limited to, cars, cargo vehicles (e.g., panel trucks, tractor-trailers, etc.), buses, recreational vehicles, emergency vehicles (e.g., ambulances, fire trucks and police cars), construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
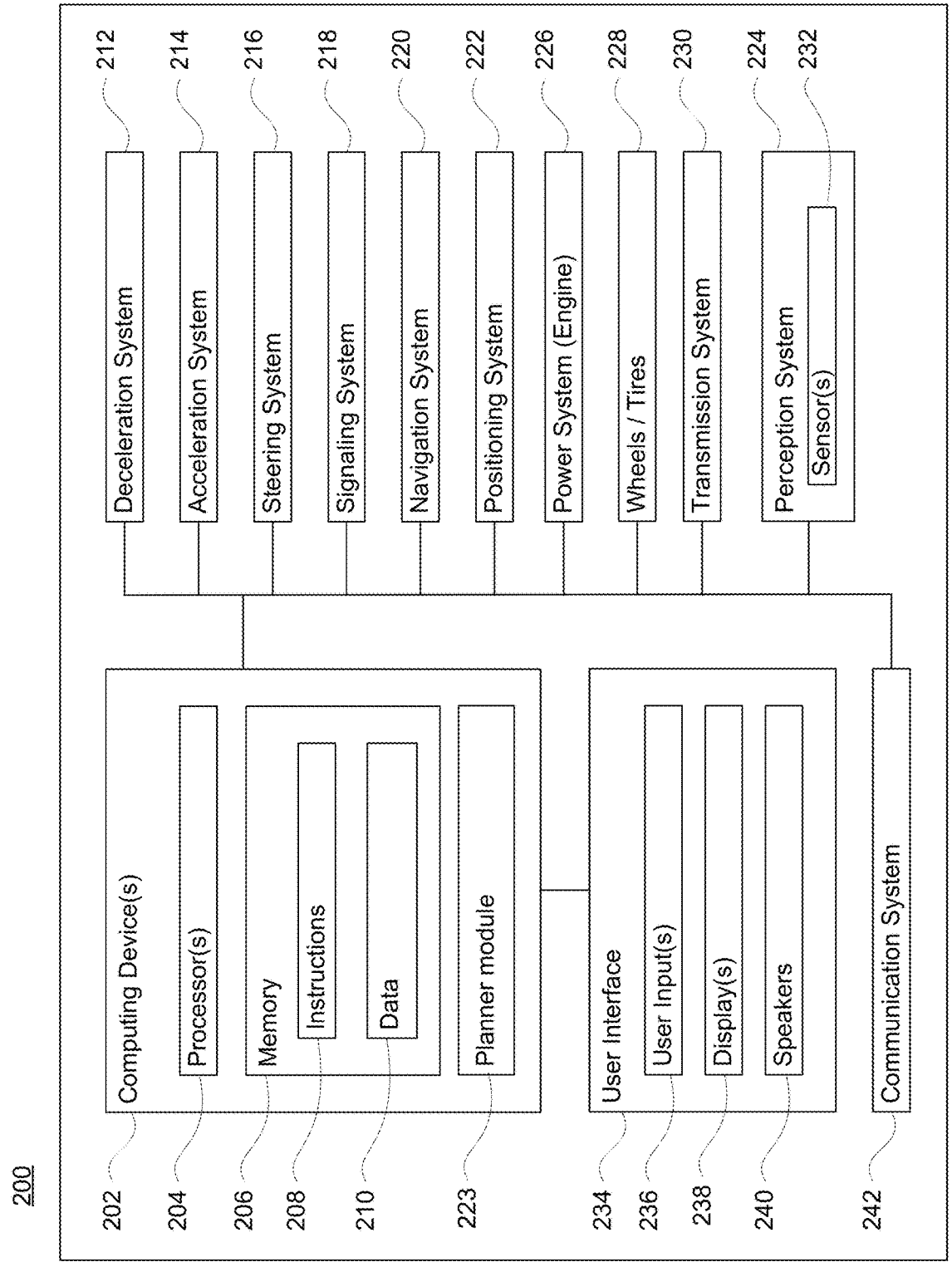
FIG. 2 illustrates components of a vehicle with a roof sensor assembly in accordance with aspects of the technology.

FIG. 2 illustrates a block diagram 200 with various components and systems of an exemplary vehicle, such as the passenger vehicles illustrated in FIGS. 1A-1C, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

As illustrated in FIG. 2, the perception system 224 includes one or more sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway. The sensors are received in housings that are disposed at one or more locations around the vehicle. Multiple sensors may be co-located in a single housing, as is described further below.

By way of example only, the perception system 224 may include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further, sensors of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform calibration of individual sensors, all sensors in a particular sensor assembly, or between sensors in different sensor assemblies or other physical housings.

As illustrated in FIGS. 1A-1C, certain sensors of the perception system 224 may be incorporated into one or more sensor assemblies or housings. In one example, these may be integrated into front, rear or side perimeter sensor assemblies around the vehicle, such as sensor housings 104, 106, 108, 142 and 144. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The vehicle may also include a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Example Implementations

FIGS. 3A-G illustrate one example of a roof pod assembly 300. As indicated with regard to roof pod 102 of FIG. 1A, the roof pod assembly 300 includes a base section 302 arranged closer to the roof of the vehicle and an upper section 304 sitting above the base section and remote from the vehicle roof. Each of these sections may include various sensor suites of the types described above, local processing systems (e.g., to process raw data from the sensors) and other equipment such as wipers or other cleaning systems to clean the various sensors. By way of example only, the front side 306 of the base section 302 may include image sensors (e.g., optical cameras) and/or radar sensors arranged to detect objects in front of the vehicle as it drives in an autonomous mode.

The elevated upper section 304 may include different types of sensors arranged in different tiers or configurations, such as part of a dome-type or layer-cake type arrangement. By way of example, a series of image sensors (e.g., optical cameras) may be arranged in a circular or other configuration in a first part 308 of the upper section, such as to provide overlapping fields of view around the vehicle. And a second part 310 of the upper section may include one or more lidar units or other sensors, which may be configured to rotate 360° or to otherwise provide a full field of view around the vehicle. In this example, the first part 308 is mounted on an upper surface of the base section 302, and the second part 310 is disposed on top of the first part 308.

As seen in FIGS. 3A-G, the roof pod assembly 300 also includes a pair of legs or other support members 312. The support members 312 are affixed to a bottom surface of the base section 302, and are configured to connect along the left and right sides of the roof of the vehicle, for instance as illustrated in FIGS. 1A and 1B. The support members 312 are arranged so that the bottom surface of the base section 302 does not rest on or directly contact the vehicle roof. The roof pod assembly 300 further includes a conduit member 314.

The front support member 312 may be affixed adjacent or along the left/right A pillars of the vehicle frame, while the rear support member 312 may be affixed adjacent or along the left/right C (or D) pillars of the vehicle frame. Because the side roof arches of the vehicle frame spanning the A, B and C (and/or D) pillars are typically formed of high strength steel or other rigid materials, it may be infeasible or impractical to run cabling, cooling lines and other conduits along these regions of the roof without impacting structural integrity, or without adding additional clearance requirements within or above the roof. This can be especially true for assemblies that are fitted to the roof after the vehicle has been manufactured. Thus, in many vehicle configurations it may not be possible to run conduits between the roof pod assembly and the vehicle through the support members.

Therefore, because it may not be feasible to connect the sensors and other components of the roof pod assembly 300 to the vehicle's on-board systems (e.g., computing devices 202) by running cabling through one or more legs of the support members 312, according to one aspect of the technology a separate cabling harness assembly distinct from the support members 312 is employed as part of the conduit member 314. As shown in FIGS. 3A-G, the conduit member 314 extends from the rear of the base section 302 of the roof pod and is configured to couple with a portion of the vehicle's roof (see FIGS. 1A-B). From this point along the roof, the individual cables, conduits and other connections may be run to the appropriate devices located within the vehicle. Other positions and arrangements of the conduit member 314 relative to the base of the roof pod assembly and/or the vehicle's roof are possible.

Figure 3A:
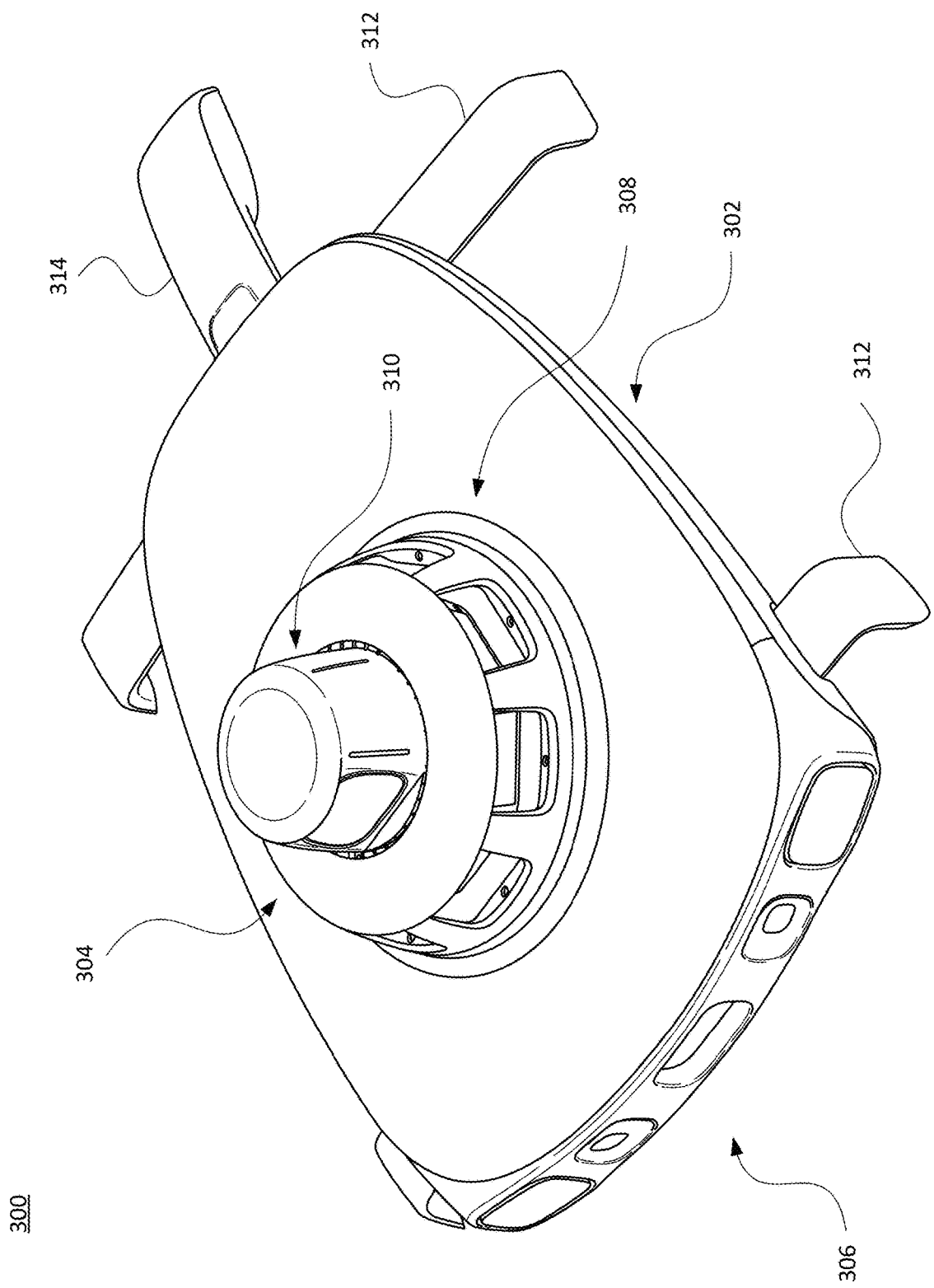
FIGS. 3A-G illustrate views of an elevated roof sensor assembly in accordance with aspects of the technology.
Figure 3B:
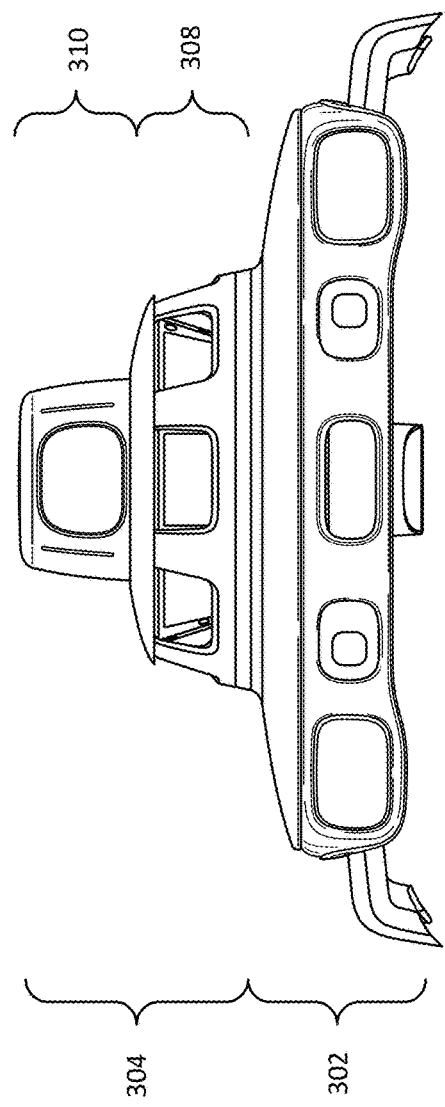
Figure 3C:
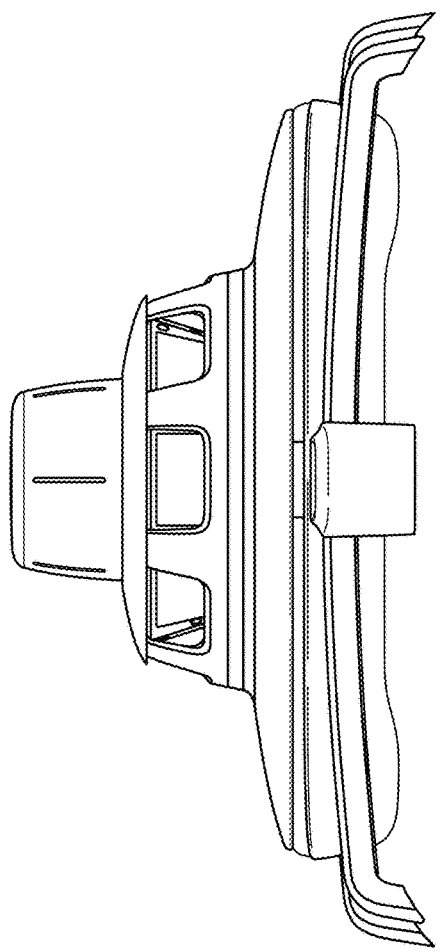
Figure 3D:
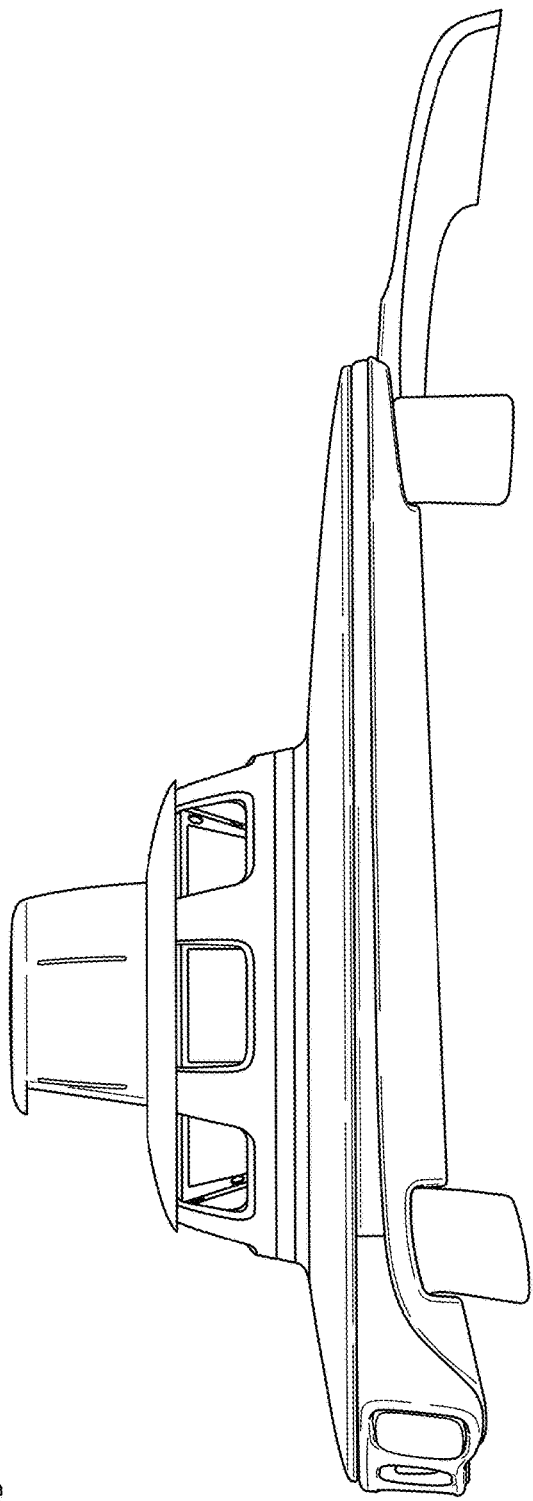
Figure 3E:
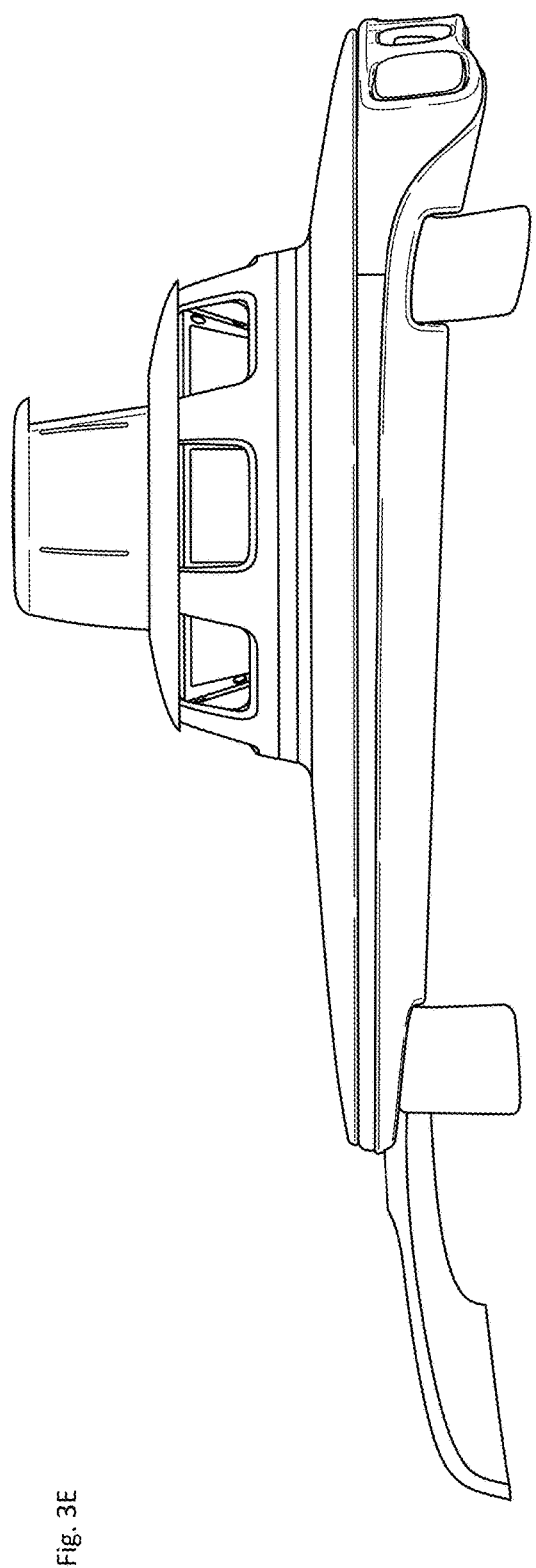
Figure 3F:
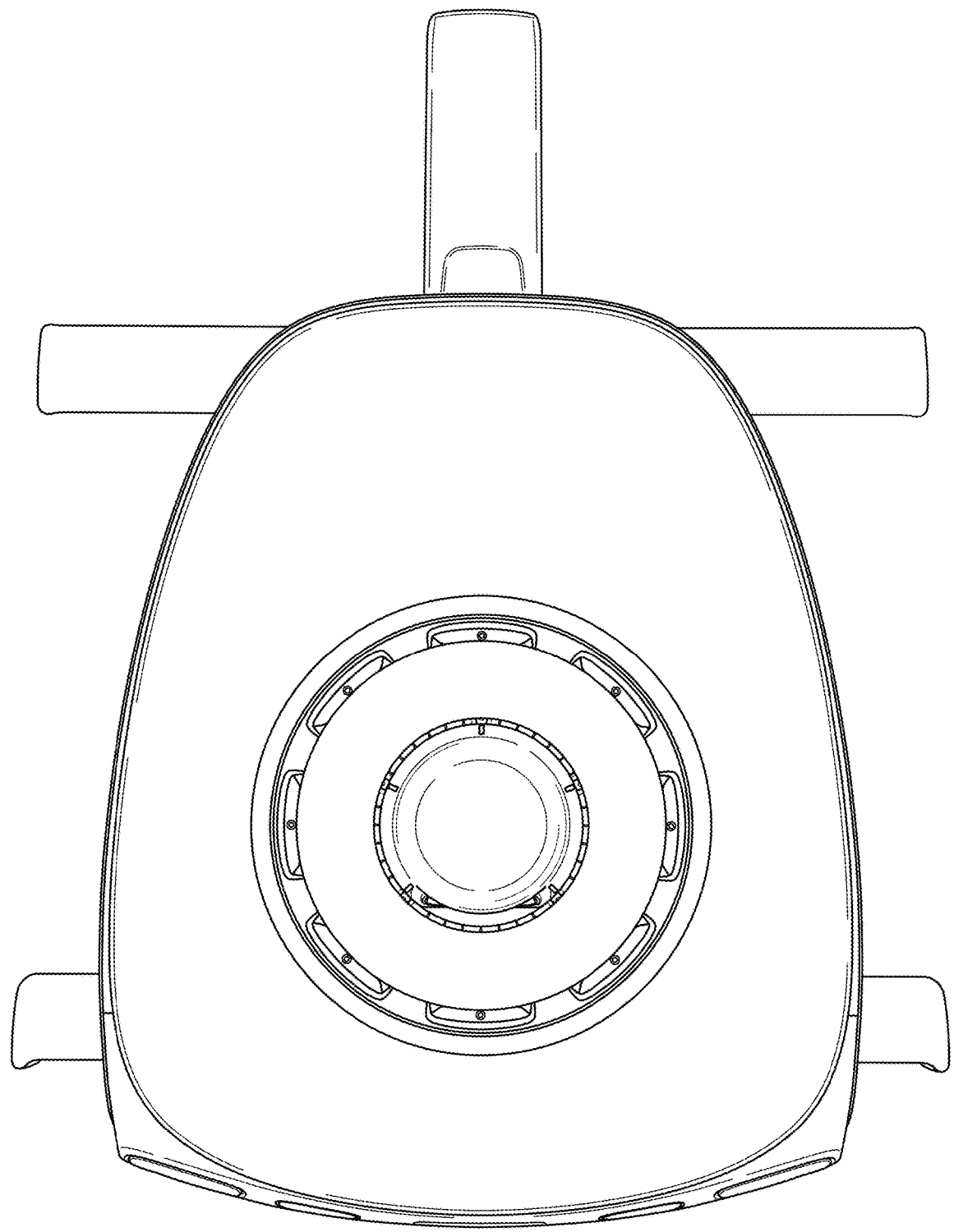
Figure 3G:
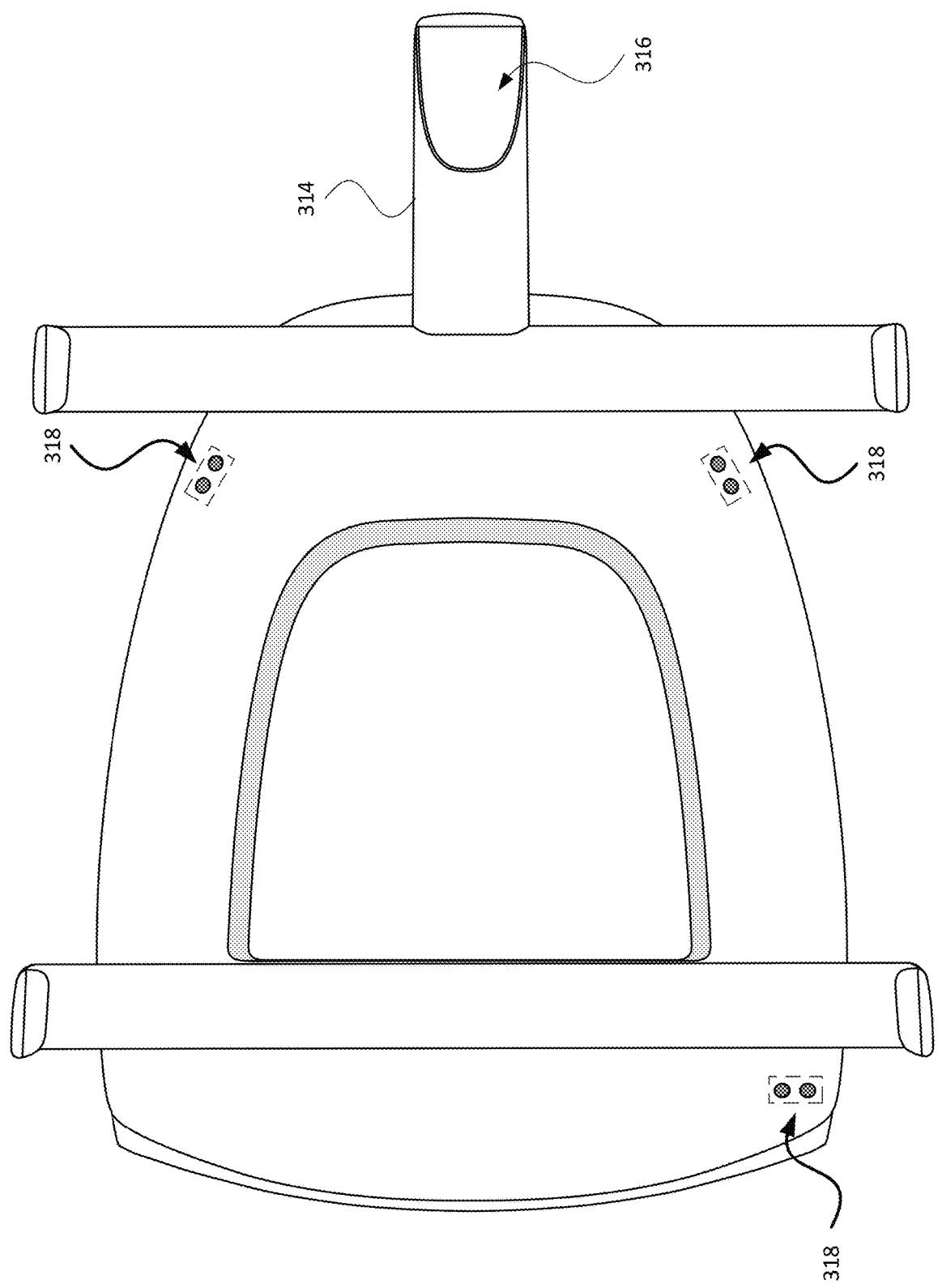

As shown in the bottom view of FIG. 3G, the end of the conduit member 314 remote from the base section 302 has an enlarged opening 316, through which wiring, conduits and other links of the cabling harness assembly are run between the sensors and other components of the roof pod assembly and the processing system and other modules of the vehicle. And as also shown in FIG. 3G, the bottom surface of the base section 302 may include locations 318 for receptacles where microphones or other transducers may be disposed. In one example, at least 3 or 4 locations, each having a pair of transducers (e.g., for localized noise cancellation), are employed in an acoustical system. Because such acoustical sensors may not be significantly impacted by thermal or optical issues, selection of color and surface type for the locations 318 may be made so as to blend in these sensors with adjacent areas of the sensor assembly.

Figure 4B:
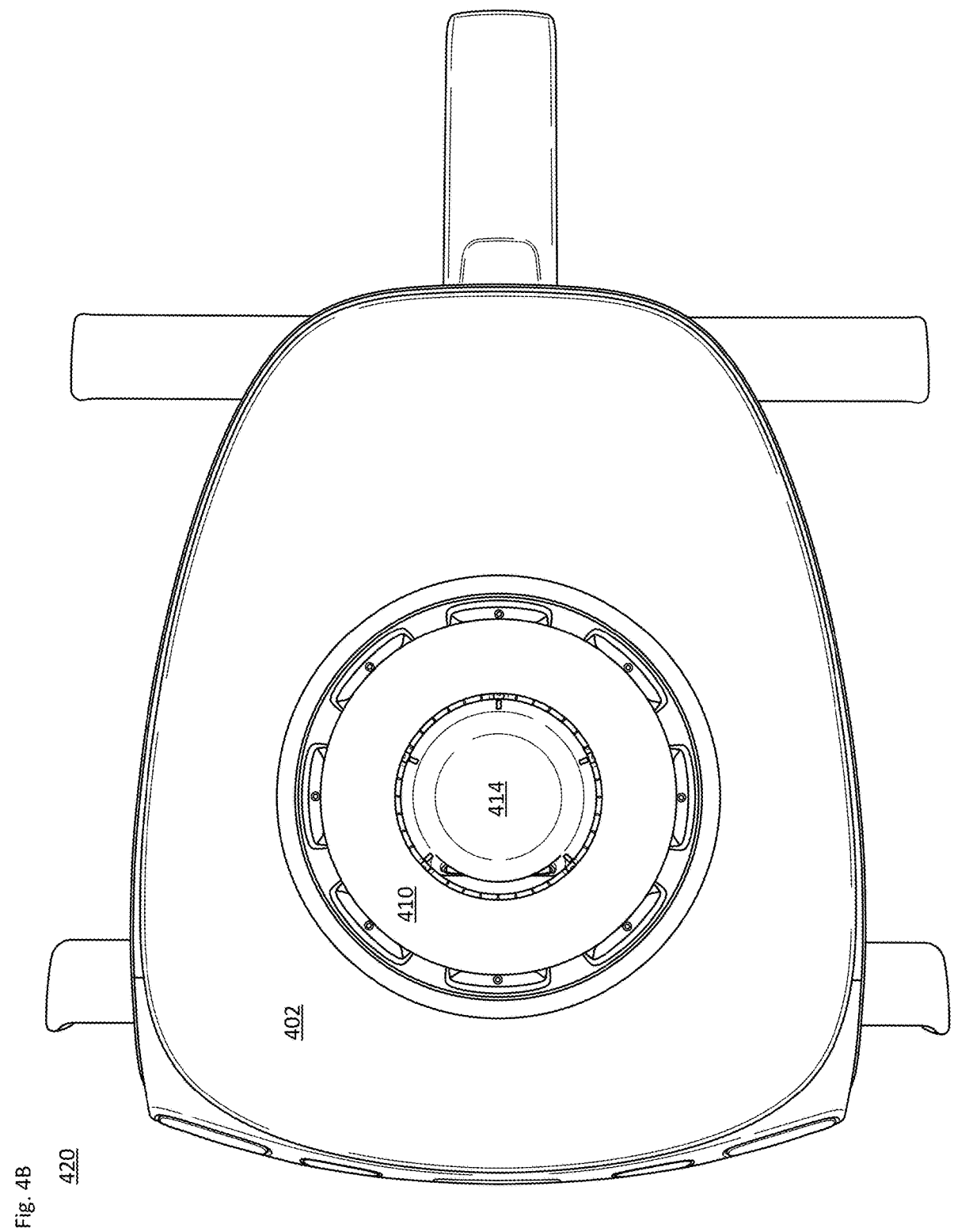

As noted above, the roof pod assembly may include sensors within different parts of the assembly housing. And those sensors may be of different types to provide specific types of information and/or different fields of view around the vehicle. The different sections of the roof pod assembly, including the base section and the first and second parts of the elevated upper section each have a number of surfaces. Some of these surfaces are generally planar or parallel to the roof of the vehicle (e.g., along the X-Y plane), while others are generally vertical (e.g., along the Z axis), as shown in perspective view 400 of FIG. 4A, which illustrates an example roof pod assembly mounted on a vehicle roof.

For instance, as seen in the perspective view 400, the base section has a top surface 402 generally planar to the vehicle's roof, a front surface 404 along the front side, and a side surface 406 that generally extends along the sides are rear of the base section (see also FIG. 3F). The side surface 406 may be integrated with the bottom side of the base section (see FIG. 3G). As can be seen in FIG. 4A, the base section of the roof pod assembly may cover a substantial portion of the vehicle's roof (e.g., at least 50% coverage, or on the order of 65-85% or more). And because the elevated upper section is significantly smaller than the base section (e.g., having a cross section on the order of 10-40% of the base section), the top surface 402 of the base section may typically have direct exposure to sunlight during daytime operation.

Different colors and surface textures (e.g., matte versus glossy) may be particularly beneficial for different surfaces of the roof pod assembly. For instance, a matte finish or lower gloss can be used to avoid glare and reflections. Darker colors can also be employed to achieve this effect (at least in the visual domain or spectrum). As discussed further below, the surfaces around the lens of a camera or radar module may be black with a matte or non-glossy finish. In one scenario, the color scheme for adjoining sensors along the same surface or region of the sensor housing would be the same, e.g., black, even if the sensors are of different types (such as cameras and radar units). However, because darker colors may cause the sensor housing to heat up more than lighter colors, in certain situations the darker colors may be employed on generally vertical surfaces relative to the vehicle while lighter colors (e.g., white or off-white) may be used on generally horizontal surfaces. A thermal coating may be applied to certain surfaces to minimize the thermal load on sensors adjacent to that portion of the housing. Furthermore, thermal coatings to achieve a lower thermal load may be applied to some or all of the horizontal surfaces or other surfaces that tend to have direct or more extended exposure to sunlight. Thus, in some instances infrared (IR) reflective paint may be used, while in other instances IR absorbing paint may be used. Radar transmissive paints or other materials may be used along the surfaces of the radar modules. Furthermore, texture changes to surfaces can be used, as they can significantly reduce direct reflections into a sensor. For instance, a rougher surface would scatter the light in many directions to diffuse or reduce the amount that potentially could be reflected or redirected into the optical sensor as compared to a mirror/glossy finish.

With regard to the elevated upper section, as seen in the figure the first part mounted on the surface 402 itself has one or more generally vertical surfaces 408 and a generally horizontal surface 410. Similarly, the second part sitting above the first part includes one or more generally vertical surfaces 412, and a generally horizontal surface 414 on the top of the second part. As illustrated by the top-down view 420 of FIG. 4B, it can be seen that the surfaces 410 and 414 are substantially smaller area-wise than the surface 402. Thus, according to one aspect of the technology, in order to reduce the solar load on the base section, the surface 402 has a light color such as white. As noted above, this lighter color may be on the order of L*89.08 (e.g., +/−5%), with a* being between −1.4 to −1.5 and b* being between −0.10-0.15. This can help to reduce the temperature within the base section of the roof pod assembly, as well as the temperature in the elevated parts of this assembly.

In some examples, it may be feasible to use a film of material or extruded plastic instead of painting and/or powder coating (e.g., for matte finish), so long as the material has the requisite reflective and/or thermal properties. For instance, a mold-in color plastic, which may or may not be textured, could be used to reduce reflections. With regard to the camera modules of the roof pod assembly or other sensor assemblies around the vehicle, the exterior surface(s) may be powder coated to achieve a matte finish. By way of example only, for these camera modules a matte finish on the order of 3.5-6.5 Gloss Units (GU) at a 60° angle of incidence may be employed, although the amount of reflection in GU and the angle of incidence may vary by, e.g., 10-20% or more or less. And with regard to the surface 410, in another example a matte finish on the order of about 15 GU (60° angle) may be employed, for instance using an electrocoating or similar process.

Figure 4C:
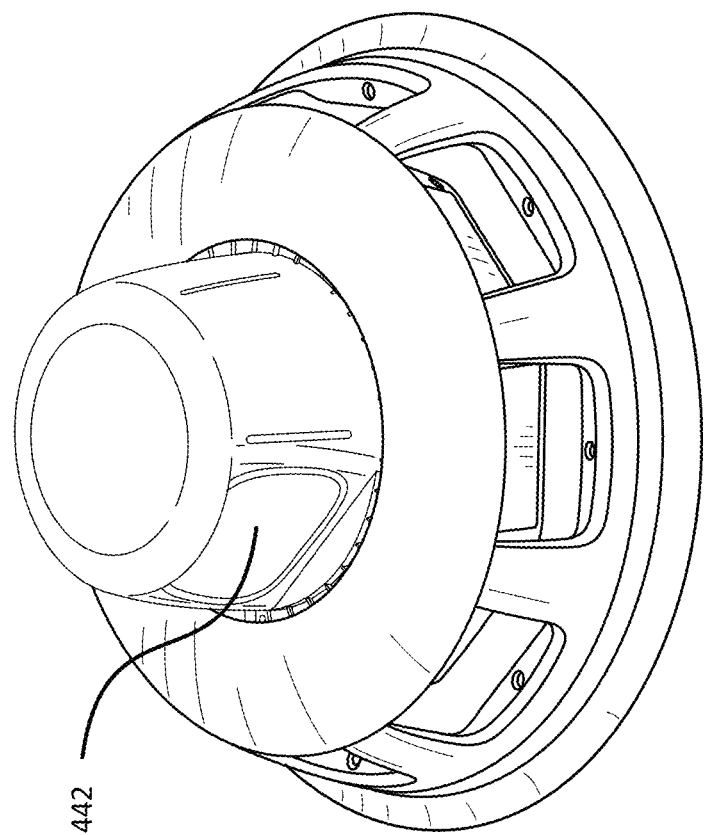
Figure 4E:
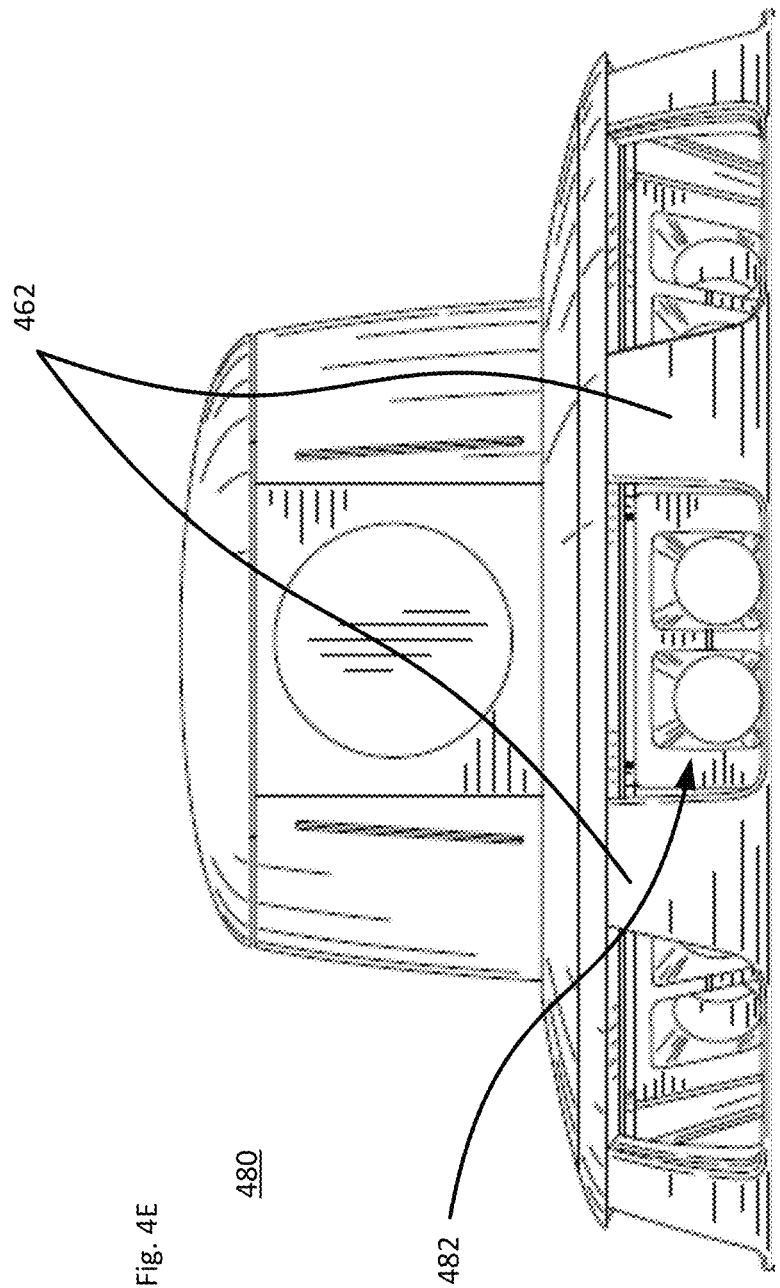

FIGS. 4C-4D illustrate enlarged views 440 and 460, respectively, of the elevated upper section of the roof pod assembly, with the base section omitted. As seen in the side view 460 of FIG. 4D, while the surface 412 is substantially vertical, it can have a slightly angled or arcuate shape from the top of surface 410 to the surface 414. The surface 408 may include a number of members 462 that are spaced apart to form openings, through which a set of cameras may have different fields of view. A set of lens covers 464 may be disposed within these openings. In this example, the members 462 of surface 408 may be arranged at an acute angle between the top surface of the base section and the surface 410. While generally vertical, the acute angle of the members 462 may be on the order of 5-15°, or no more than 25°. And as shown, the generally planar horizontal surface 410 may be curved or angled between the second part (310) of the upper section and the surface 408. FIG. 4E illustrates a view 480 with a variation in which the lens covers are omitted, showing one or more cameras 482 in each opening between the members 462. From a camera glare standpoint, the regions between the cameras (e.g., the space between the baffle cones) does not necessarily need to be black if those surfaces do not have a line-of-sight into the lens. However, when there are multiple sensors sharing a single window (such as in the example of FIG. 4E) which provides a line-of-sight via window reflection, a dark matte color can be selected.

In these examples, because the surface area of the surface 410 is much smaller than the surface area 402, there may be less concern about the temperature or a thermal impact for the first part of the upper section. Thus, the surface 410 may be selected to have a darker color (see FIGS. 4C-4D) that contrasts with the lighter color of the surface 402. By way of example only, the darker color may be L*24.48, a*0.24, b*−0.61 or L*51.47, a*−5.95, b*−43.86 in the CIELAB color space. However, the surface 410 may be reflective to infrared (IR) light and have a matte finish. For instance, a matte black-type finish on the surface 410 may be selected to have a high solar reflectivity for temperature management and low IR reflectivity, while not reflecting certain wavelengths to avoid interference with sensors disposed along the second part of the upper section, such as a lidar sensor (illustrated as 442 in FIG. 4C).

Because the surface 414 is the topmost surface and reflections from it would not be visible to or otherwise impact sensors arranged along other parts of the roof pod assembly, this surface may be selected to have a light color such as white. In one example the color for surface 414 may be the same color as for surface 402. In addition, surface 414 may include holes or other openings (not shown) for active or passive thermal venting of hot air out of the roof pod assembly.

Figure 4F:
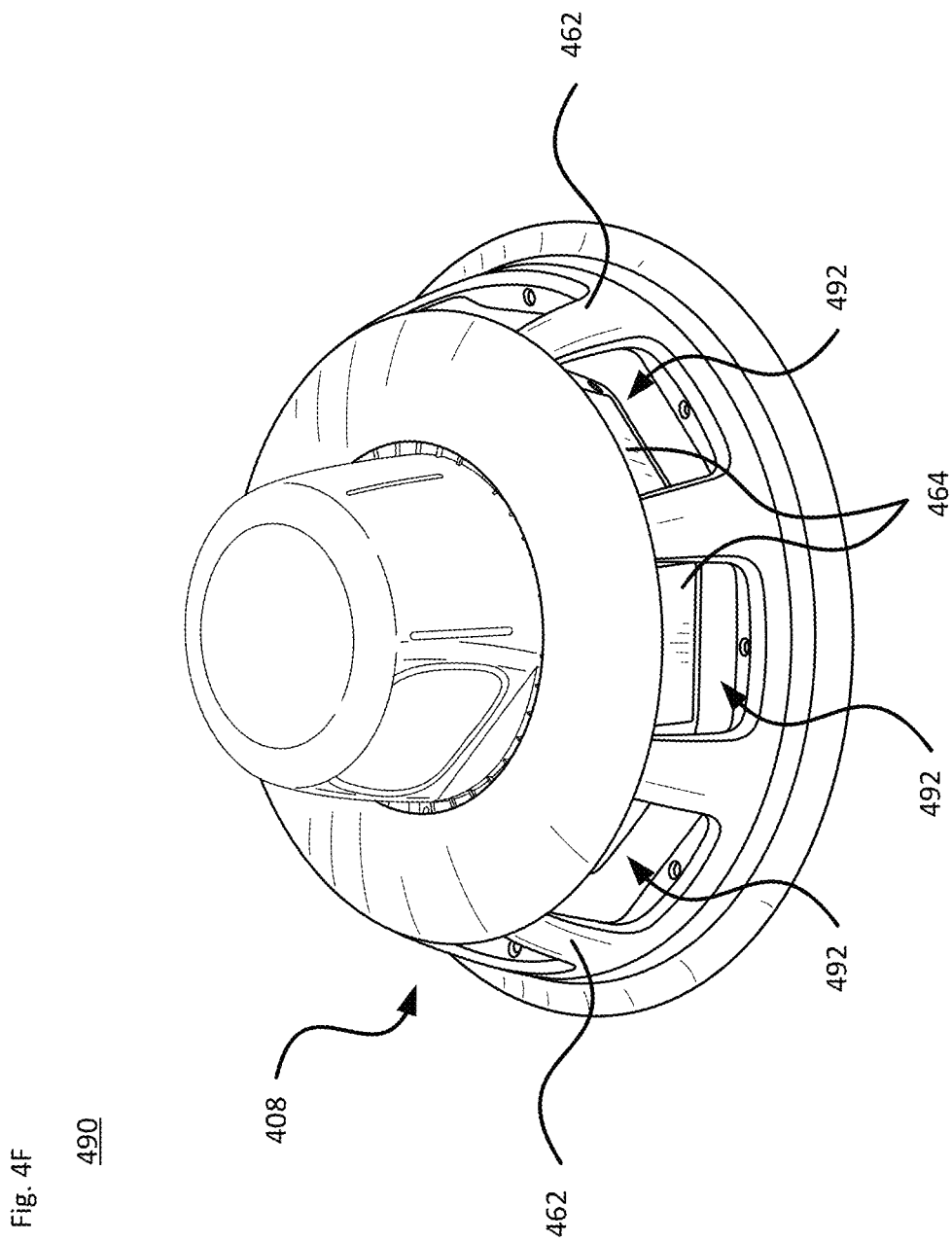

In addition, surfaces surrounding or otherwise adjacent to a sensor unit may also be selected to have a particular color scheme. As seen in view 490 of FIG. 4F, the perimeter surface(s) 492 immediately adjacent to the lens covers 464 may be a dark matte color, while the lens covers 464 may be clear glass or plastic. Here, the matte color may be non-reflective to optical light, in order to reduce artifacts and other issues with the cameras positioned behind the lens covers.

In view of the above, according to one scenario the roof pod assembly may generally have a dual color scheme. This could be black for the surfaces adjacent to sensors or surfaces that may cause reflections or create glare onto sensor, and white for other surfaces to reduce the thermal load (e.g., on certain horizontal surfaces) or otherwise differentiate from the adjacent surface. Thus, vertical side surface 406, which does not include any camera, lidar or radar sensors and does not create reflections or glare onto such sensors, may be white. In contrast, surface 404, which can include multiple different sensors such as cameras and radar units, may be black. This contrast between surfaces 404 and 406 may also provide a visual differentiation between these surfaces.

Nonetheless, in another scenario, one or more portions of surfaces may have a different color that the other surfaces. For instance, as shown in FIG. 4D, a circular band 466, which is positioned above the surface 402 and is below the openings with the lens covers 464, may have a contrasting color different from other portions of surface 408. In one example, the surface 408 may generally be a black color, such as L*24.48, a*0.24, b*−0.61, while the circular band 466 may be a blue color, such as L*51.47, a*−5.95, b*−43.86 in the CIELAB color space. According to this example, these values may be higher or lower, e.g., +/−10-15% for any L, a or b value. In another scenario, this band could be illuminated by LEDs or another active lighting feature.

While a sensor system such as the roof pod assembly may be susceptible to thermal issues from direct sunlight due to the relatively large size of the housing, other sensor units along the vehicle may also benefit from the two tone (or three tone) color scheme described above. For instance, the housings 106a, 106b (see FIGS. 1A-1B), which may each incorporate lidar, radar, camera and/or other sensors, are disposed along the driver's and passenger's sides of the vehicle. In addition to the top surface having direct exposure to sunlight (like surfaces 402, 410 and 414 of the roof pod assembly), this perimeter sensor assembly may encounter increased temperatures due to the placement of the vehicle's engine under the hood and adjacent to the front quaterpanels.

FIGS. 5A-5F illustrate an example 500 of this type of side perimeter sensor assembly. In this example, the housing may be configured for placement along the left front quarterpanel on the driver's side (for a U.S.-style orientation). A mirror image of this example side perimeter sensor assembly may be positioned along the right front quarterpanel on the passenger's side. FIGS. 5B-E illustrate various views of the side perimeter housing 500. As shown in the perspective view of FIG. 5A and front view of FIG. 5B, the suite of sensors in the example 500 includes a lidar unit 502, a close sensing camera assembly 504, a radar unit 506, a forward-facing perimeter view camera 508 and a side-facing perimeter view camera 510 arranged along the same exterior surface as the radar unit 506.

Figure 5A:
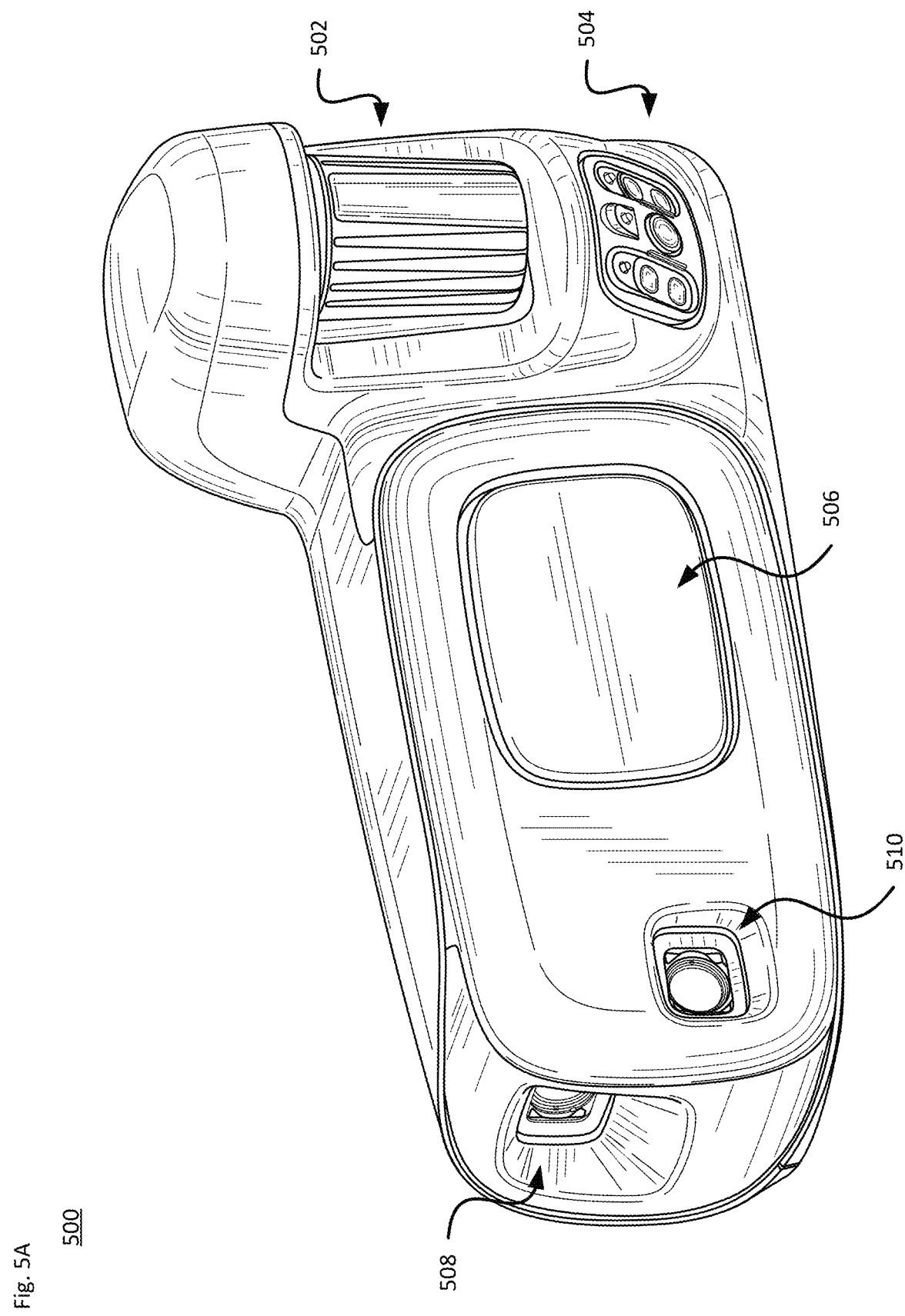
FIGS. 5A-F illustrate aspects of side perimeter sensor assembly in accordance with aspects of the technology.
Figure 5B:
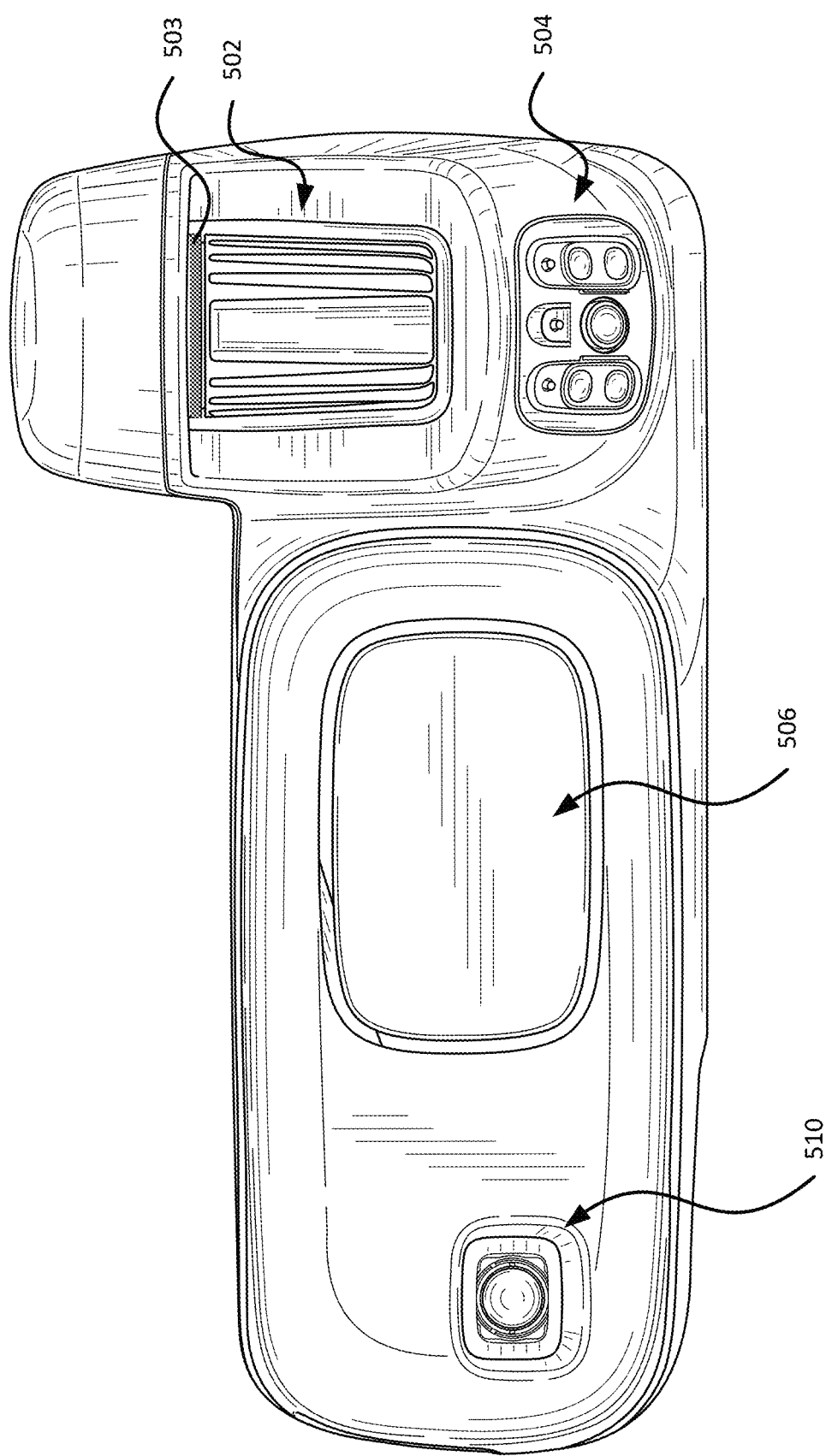

As shown in FIGS. 5A-5B the radar unit 506 is disposed between the front and side-facing cameras 508 and 510 on the one side and the lidar unit 502 and close sensing camera assembly 504 on the other side. Separation between the radar unit and the aligned lidar and close sensing camera assembly may beneficially avoid interference and potential occlusion.

In this example, the close sensing camera assembly 504 is disposed below the lidar unit 502, for instance to enable object classification to supplement object detection by the lidar unit. While shown aligned below the lidar unit 502, the camera of the close sensing camera assembly 504 may be located anywhere within approximately 0.25-0.4 m of the lidar unit 502. In order to avoid parallax, which may adversely impact image classification, the camera should be as close as possible to the lidar unit without creating occlusions between the sensors. And while shown aligned below the lidar unit 502, the camera(s) of the close sensing camera assembly 504 may be disposed above the lidar unit 502. Either arrangement minimizes the likelihood of occlusion and parallax. Spatial constraints of the housing unit and/or the vehicle's overall dimensions may also limit placement of the sensors relative to one another.

Figure 5C:
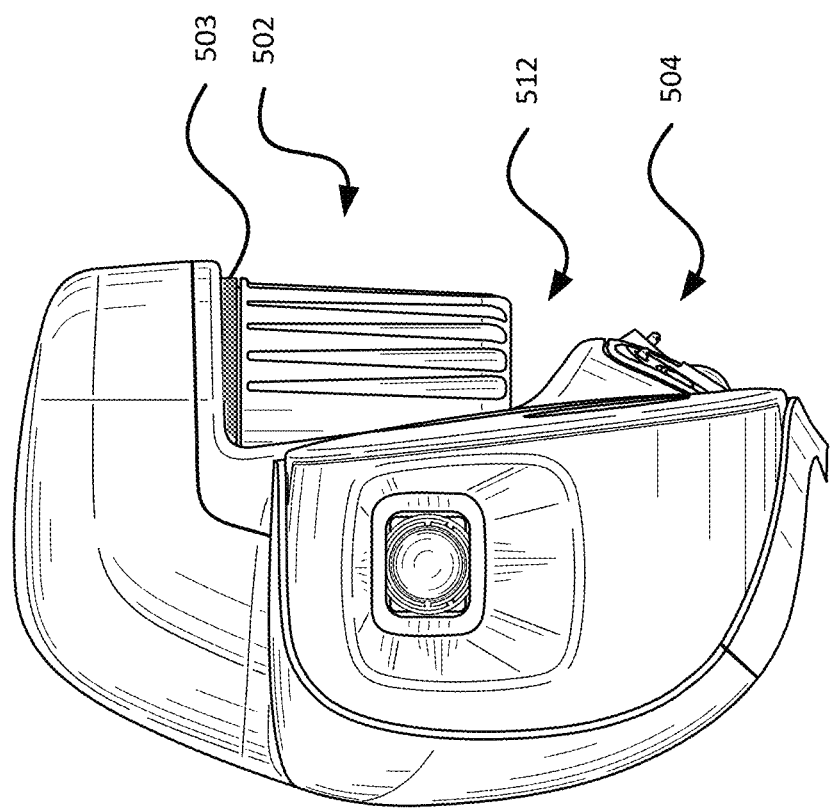
Figure 5D:
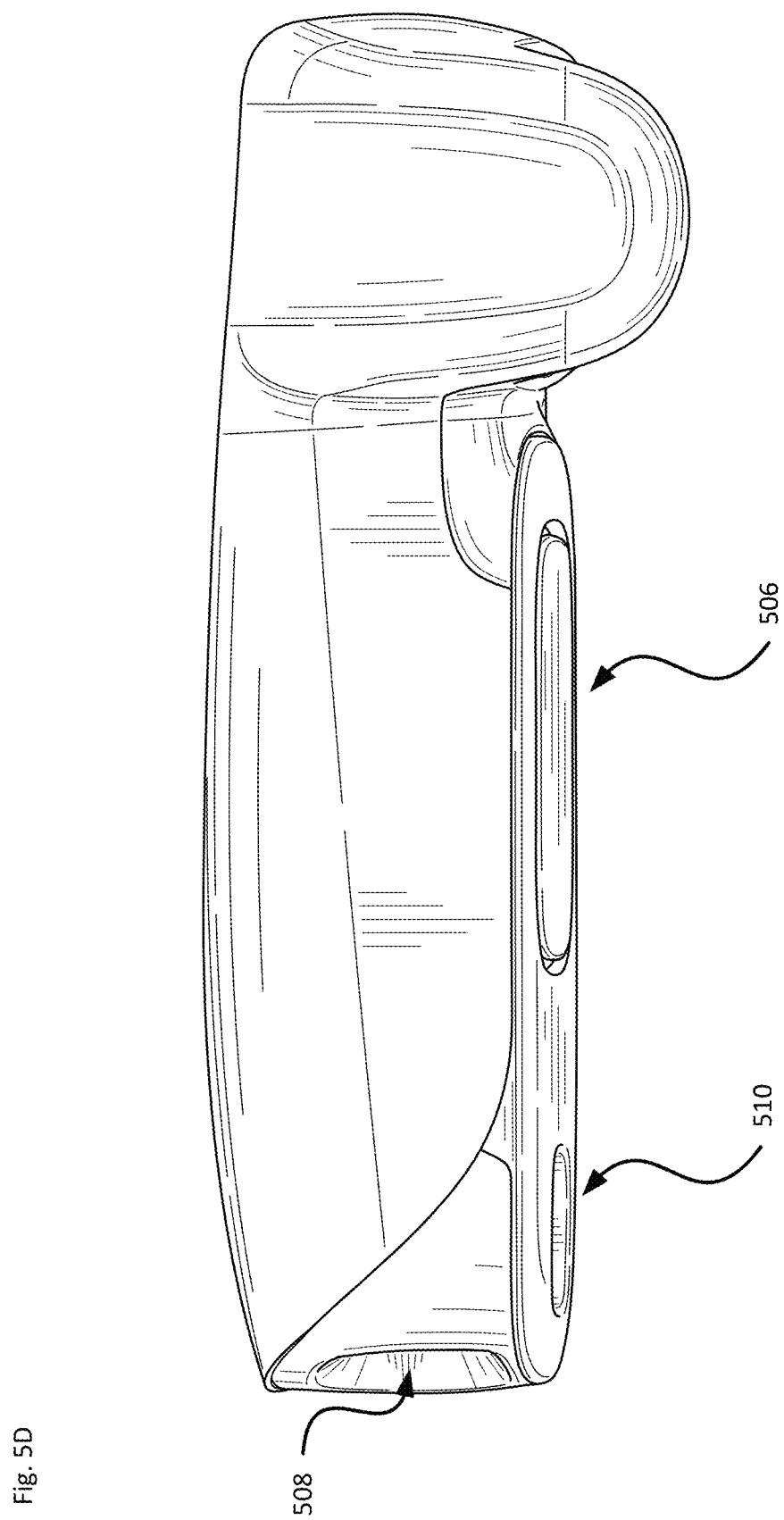

As shown in the side views of FIG. 5C, the housing may include a separating surface 512 between the lidar unit 502 and the close sensing camera assembly 504. The separating surface may be arranged at a downward sloping angle. The outward sloping surface allows water, snow, etc., to slide off, which minimizes the likelihood of an obstruction or occlusion of the sensors. And as illustrated, while generally vertical, the surface of the close sensing camera assembly 504 may be angled downward by, e.g., 10-25° in order to detect objects adjacent to the vehicle. As the lidar sensor may have a limited view immediately beneath itself, aligning the camera assembly directly below it the lidar helps with object detection of potentially lidar-occluded objects. For instance, as shown in the side view of FIG. 5C, the close sensing camera assembly 504 is angled downward to cover the immediate vicinity around the vehicle.

Figure 5E:
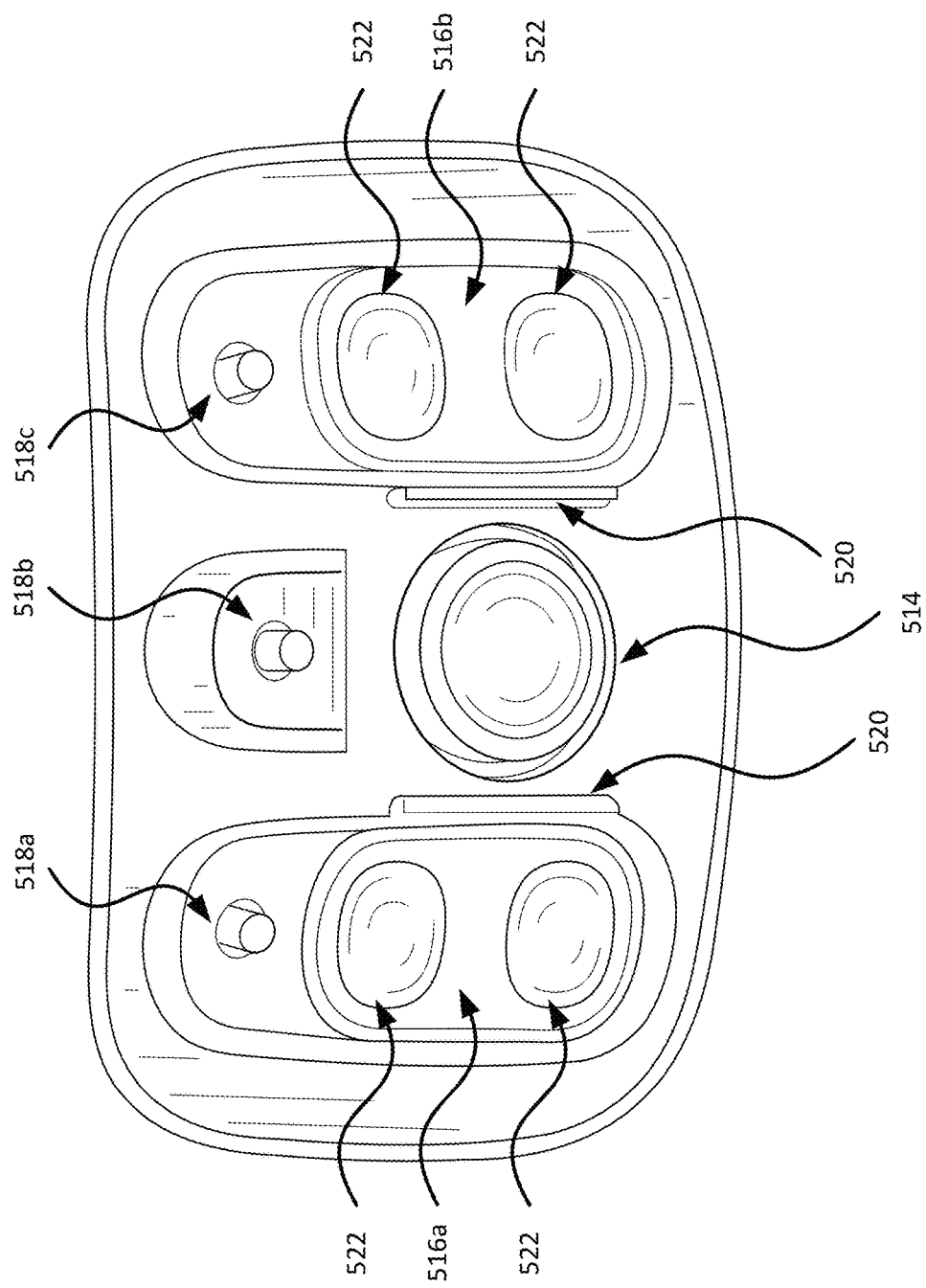
Figure 5F:
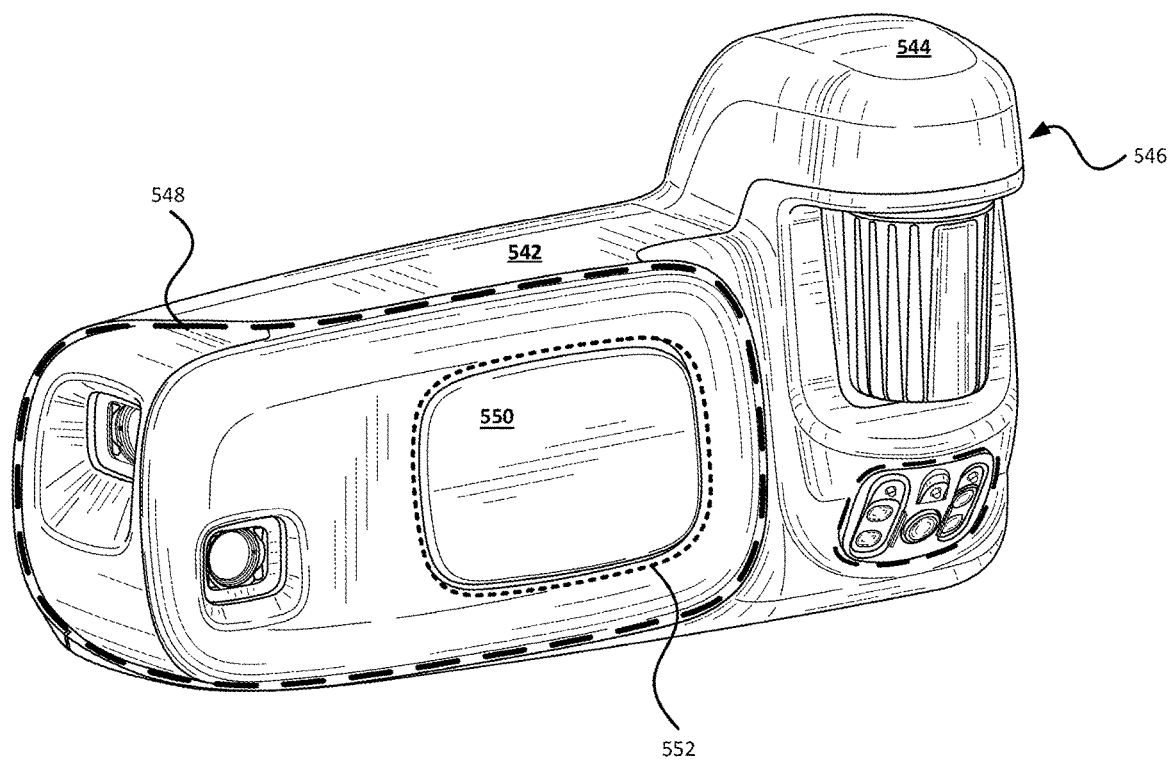

The enlarged view of FIG. 5E illustrates that the assembly 504 may include a camera 514, an illuminator module having a pair of illuminator lenses or covers 516a and 516b, and a set of cleaning mechanisms 518a, 518b and 518c. Extensions 520 may be included that extend from the housing surface to ensure that there is no leakage of light into the lens of the camera 514. Each illuminator cover 516a and 516b may include one or more secondary lenses 522, which can be employed to focus the light, e.g., IR light, along one or more desired areas. By way of example, these secondary lenses 522 can increase the width of the field of view for the illuminator module. The cleaning mechanisms 518 may include fluid and/or forced air sprays to clean the camera and/or illuminator modules. Alternatively or additionally, one or more wipers (not shown) may be employed to keep the lenses clean.

Similar to the color arrangements described above for the roof pod assembly, different surfaces of the side perimeter sensor assembly may have contrasting colors. For instance, as seen in view 540 of FIG. 5F, upper surfaces 542 and 544 may have a light color such as white. As noted above, this lighter color may be on the order of L*89.08 (e.g., +/−5%), with a* being between −1.4 to −1.5 and b* being between −0.10-0.15. This can help reduce the temperature within the side perimeter sensor assembly, which may be elevated due to exposure to the sun or heat produced by the engine. In addition to these horizontal surfaces having a light color, side surface 546, which encompasses the lidar unit, may also have the same or similar light color. This can provide a continuous appearance between the upper surface 544s and the side surface 546. In one scenario, the lidar unit may have a coating with high scratch resistance formed via electro-coating or a similar process, e.g., because the exposed part of the lidar unit will spin during operation. For instance, the finish may be on the order of 75-85 GU at a 20° angle of incidence, or more or less.

In contrast, other regions of the side perimeter sensor assembly may be selected to have a darker color that contrasts with the lighter color of the surfaces 542, 544 and 546. In particular, the generally vertical surfaces within region 548 (encompassed within a dashed line), and the close sensing camera assembly within region 550 (also encompassed within a dashed line), may have a darker color. By way of example only, the darker color may be L*24.48, a*0.24, b*−0.61 or L*51.47, a*−5.95, b*−43.86 in the CIELAB color space.

In this example, the cover of the radar unit, as shown by dotted line 552, may have a radar-transmissive dark paint, which blends with the other parts of the region 548. In the parts of region 548 outside of the radar cover 552, as well as in region 550, the regions around the cameras may have a matte black-type finish. Alternatively or additionally, region 550 may include IR absorbing anti-glare paint. This may be done to avoid extraneous IR light from adversely impacting imagery from the close sensing camera(s). For instance, the finish may be on the order of 1 GU at a 60° angle of incidence, or more or less.

In the above scenario, the side perimeter sensor assembly has white color along the horizontal surfaces without sensors in addition to a white surface area adjacent to the lidar unit. And the generally vertical side surfaces with the cameras and/or radar units are darker (e.g., black) in color. Nonetheless, in another scenario, one or more portions of surfaces may have a different color that the other surfaces. For instance, as shown in FIGS. 5B-5C, band 503, which is part of the lidar unit 502, may have a contrasting color different from other portions of surface 408. In one example, the band 503 may be a blue color, such as L*51.47, a*−5.95, b*−43.86 in the CIELAB color space. According to this example, these values may be higher or lower, e.g., +/−10% for any L, a or b value.

Other sensor assemblies around the vehicle may also have certain color requirements, which may or may not be the same as with the roof pod assembly or the side perimeter sensor assembly. For instance, the housing 104 of the front sensor assembly and the housing 144 of the central rear assembly may have fewer sensor modules than other assemblies. Also, due to the placement of these housings lower along the front and rear of the vehicle, there may be less stringent thermal constraints as well.

FIGS. 6A-6D illustrate one example 600 of a front sensor assembly that may be arranged along or adjacent to the front bumper (see 104 in FIGS. 1A-1B), for instance to detect and classify objects directly in front of the vehicle. FIGS. 6A-6D illustrate various views of the front sensor assembly. As shown in the perspective view of FIG. 6A and front view of FIG. 6B, the suite of sensors includes a lidar unit 602 and a close sensing camera assembly 604.

In this example, the close sensing camera assembly 604 is disposed directly above the lidar unit 602, for instance to enable object classification to supplement object detection by the lidar unit. While shown aligned above the lidar unit 602, the camera of the close sensing camera assembly 604 may be located anywhere within approximately 0.25-0.4 m of the lidar unit 602. In order to avoid parallax, which may adversely impact image classification, the camera should be as close as possible to the lidar unit without creating occlusions between the sensors. And while shown above the lidar unit 602 in this example, the camera of the close sensing camera assembly 604 may be disposed below the lidar unit 602 in another example. Either arrangement minimizes occlusion. Spatial constraints of the housing unit and/or the vehicle's overall dimensions may also limit placement of the sensors.

Figure 6D:
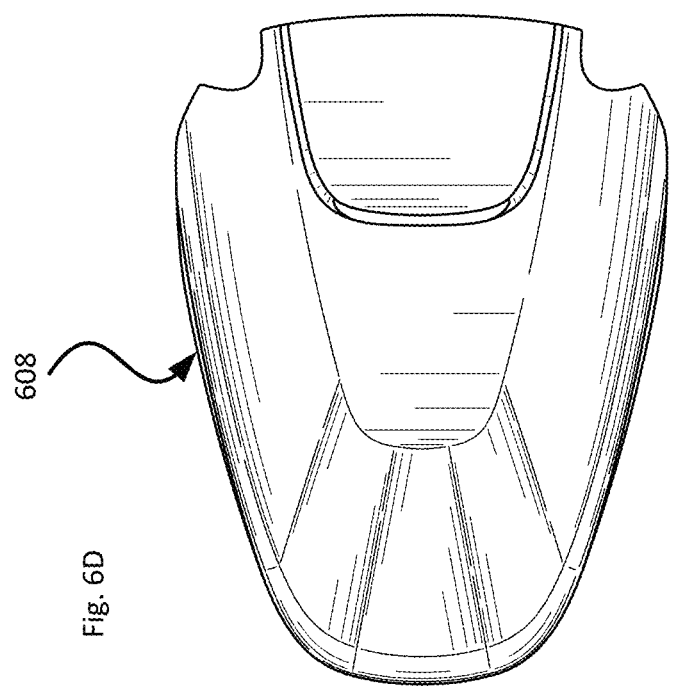
Figure 6C:
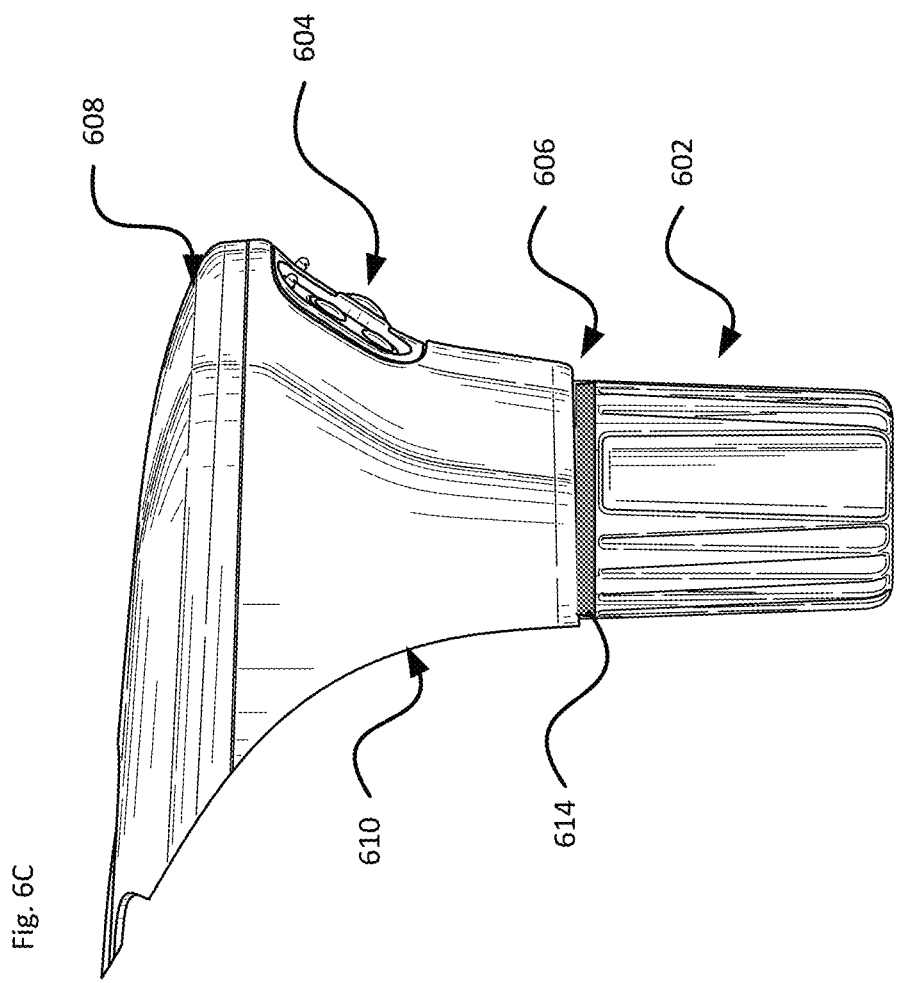

As shown in the side view of FIG. 6C, there is a separating surface 606 between the lidar unit 602 and the close sensing camera assembly 604. The separating surface may be arranged at an angle, e.g., to allow water, snow, etc., to slide off, which minimizes the likelihood of an obstruction or occlusion of the sensors. Also shown in the side view, the surface of the close sensing camera assembly 604 may be angled downward by, e.g., 10-25° in order to detect objects adjacent to the vehicle. The close sensing camera assembly 604 may have the same configuration as the close sensing camera assembly 504 described above, including one or more (IR) illuminator modules, cleaning mechanisms, and/or extensions to reduce or eliminate light leakage into the camera(s). And as seen from the side view of FIG. 6C and the top-down view of FIG. 6D, the assembly housing may be arranged so that the sensors 602 and 604 do not extend laterally beyond upper surface 608. For instance, the generally vertical sidewall 610 may taper from the base of the upper surface 608 to the lidar unit 602.

In one scenario, the lidar unit may have a coating with high scratch resistance formed via electrocoating or a similar process as discussed above, e.g., because the exposed part of the lidar unit will spin during operation. In the region 612 shown in a dashed line that encompasses the close sensing camera assembly, the area around the camera(s) may have a matte black-type finish. Alternatively or additionally, region 612 may include IR absorbing anti-glare paint. This may be done to avoid extraneous IR light from adversely impacting imagery from the close sensing camera(s). Other parts of this assembly, including the lidar unit 602, upper surface 608, and sidewall 610, may have either a light or dark color, for instance to match the front grille of the vehicle. For instance, a darker color (e.g., black) may be L*24.48, a*0.24, b*−0.61 in the CIELAB color space, while a lighter color (e.g., white or off white) may be on the order of L*89.08, with a* being between −1.4 to −1.5 and b* being between −0.10-0.15. These values may be higher or lower, e.g., +/−10% for any L, a or b value.

Nonetheless, in another scenario, one or more portions of the front sensor assembly may have a different color that the other surfaces. For instance, as shown in FIGS. 6B-6C, band 614, which is part of the lidar unit 602, may have a contrasting color different from other portions of the lidar unit, or surfaces 608 and/or 610. In one example, the band 612 may be a blue color, such as L*51.47, a*−5.95, b*−43.86 in the CIELAB color space. According to this example, these values may be higher or lower, e.g., +/−10% for any L, a or b value.

Figure 7A:
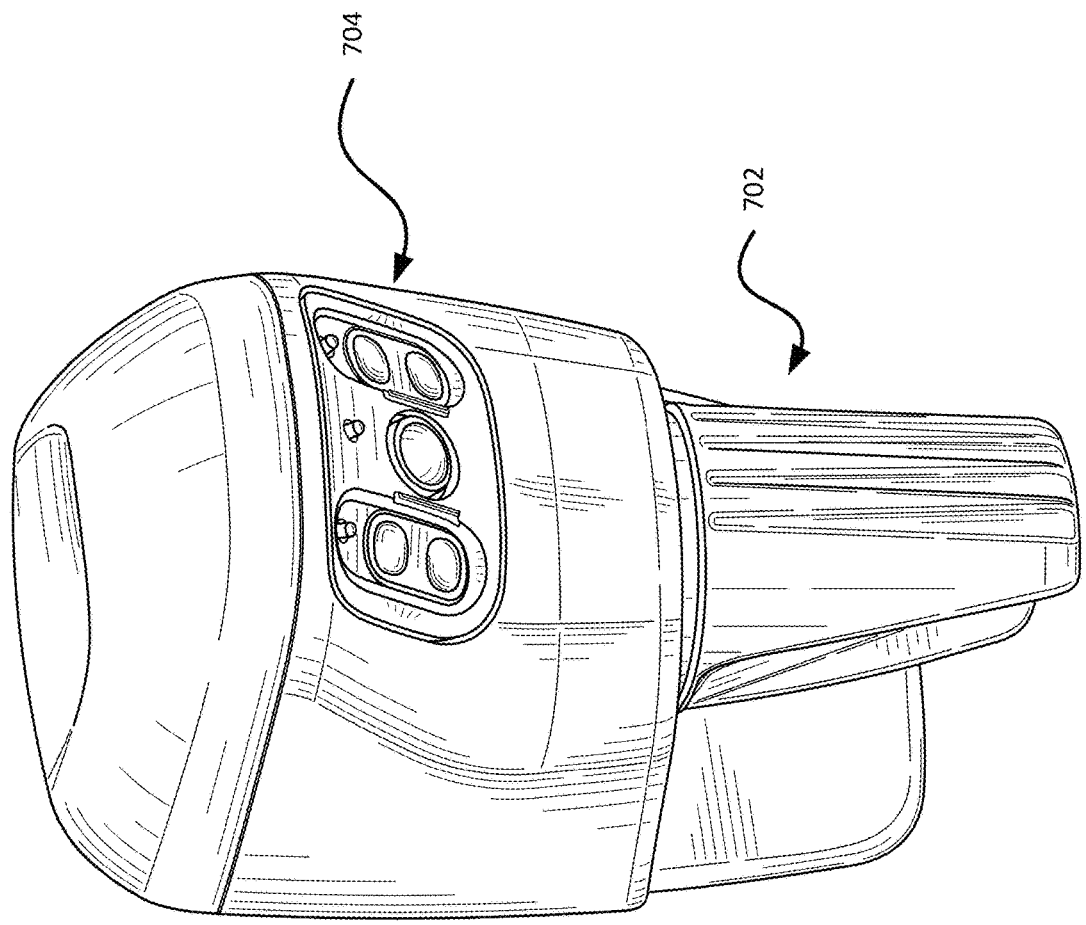
FIGS. 7A-C illustrate features of a rear perimeter sensor assembly in accordance with aspects of the technology.
Figure 7C:
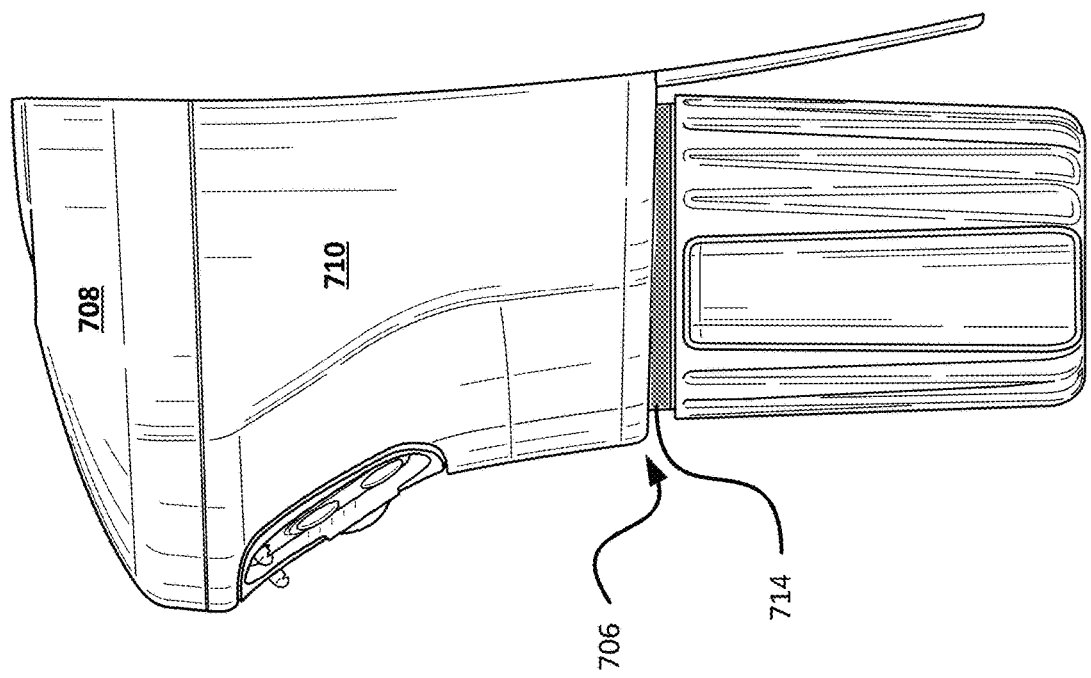
Figure 7B:
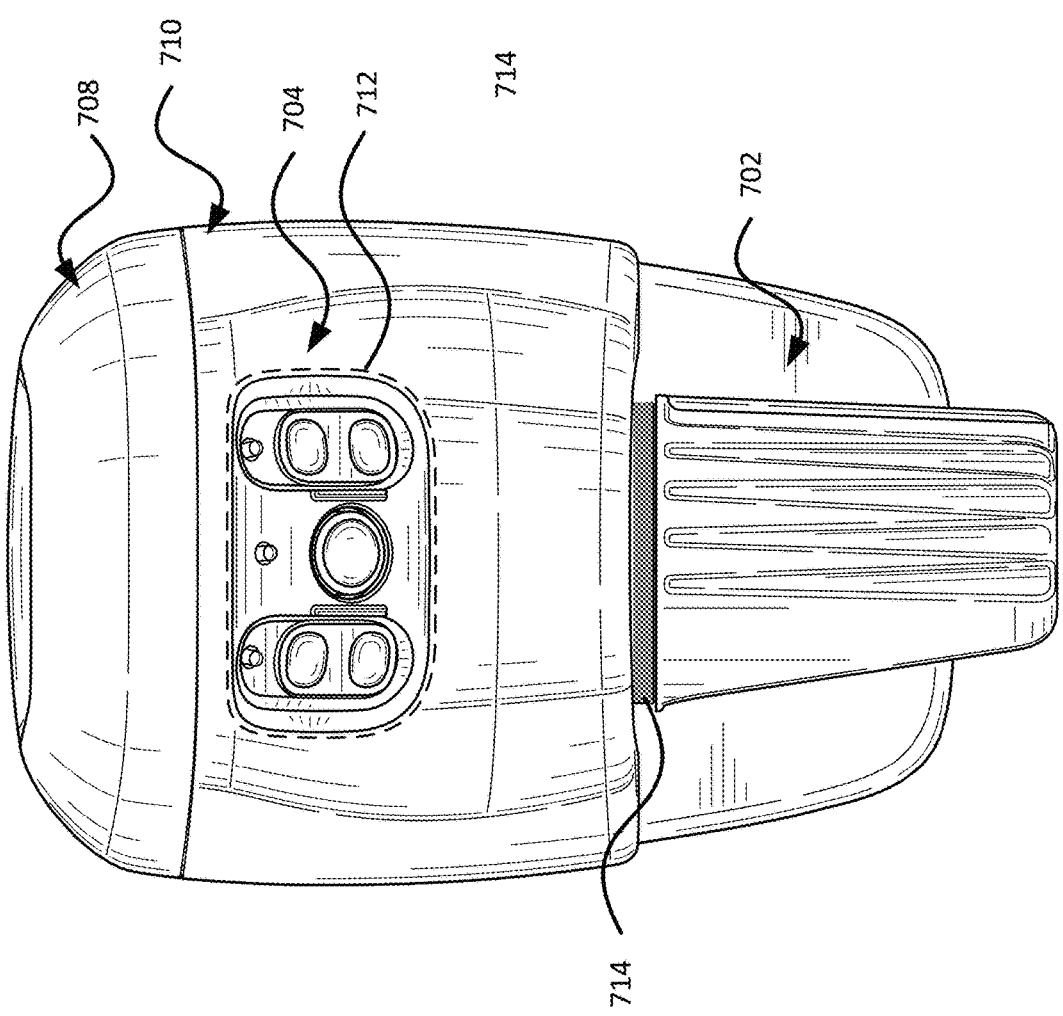

FIGS. 7A-7C illustrate one example 700 of a rear sensor assembly that may be arranged along or adjacent to the rear bumper (see 144 in FIG. 1C), for instance to detect and classify objects directly in front of the vehicle. FIGS. 7A-7C illustrate various views of the front sensor assembly. As shown in the perspective view of FIG. 7A and front view of FIG. 7B, the suite of sensors includes a lidar unit 702 and a close sensing camera assembly 704.

In this example, the close sensing camera assembly 704 is disposed directly above the lidar unit 702, for instance to enable object classification to supplement object detection by the lidar unit. While shown aligned above the lidar unit 702, the camera of the close sensing camera assembly 704 may be located anywhere within approximately 0.25-0.4 m of the lidar unit 702. In order to avoid parallax, which may adversely impact image classification, the camera should be as close as possible to the lidar unit without creating occlusions between the sensors. And while shown above the lidar unit 702 in this example, the camera of the close sensing camera assembly 704 may be disposed below the lidar unit 702 in another example. Either arrangement minimizes occlusion. Spatial constraints of the housing unit and/or the vehicle's overall dimensions may also limit placement of the sensors.

As shown in the side view of FIG. 7C, there is a separating surface 706 between the lidar unit 702 and the close sensing camera assembly 706. The separating surface may be arranged at an angle, e.g., to allow water, snow, etc., to slide off, which minimizes the likelihood of an obstruction or occlusion of the sensors. Also shown in the side view, the surface of the close sensing camera assembly 704 may be angled downward by, e.g., 10-25° in order to detect objects adjacent to the vehicle. The close sensing camera assembly 704 may have the same configuration as the close sensing camera assembly 504 described above, including one or more (IR) illuminator modules, cleaning mechanisms, and/or extensions to reduce or eliminate light leakage into the camera(s). And as seen from the side view of FIG. 7C, the assembly housing may be arranged so that the sensors 702 and 704 do not extend laterally beyond upper surface 708. For instance, the generally vertical sidewall 710 may taper from the base of the upper surface 708 to the lidar unit 702.

In one scenario, the lidar unit may have a coating with high scratch resistance formed via electrocoating or a similar process as discussed above, e.g., because the exposed part of the lidar unit will spin during operation. In the region 712 shown in a dashed line that encompasses the close sensing camera assembly, the area around the camera(s) may have a matte black-type finish. Alternatively or additionally, region 712 may include IR absorbing anti-glare paint. This may be done to avoid extraneous IR light from adversely impacting imagery from the close sensing camera(s). Other parts of this assembly, including the lidar unit 702, upper surface 708, and sidewall 710, may have either a light or dark color, for instance to match the front grille of the vehicle. For instance, a darker color (e.g., black) may be L*24.48, a*0.24, b*−0.61 in the CIELAB color space, while a lighter color (e.g., white or off white) may be on the order of L*89.08, with a* being between −1.4 to −1.5 and b* being between −0.10-0.15. These values may be higher or lower, e.g., +/−10% for any L, a or b value.

Nonetheless, in another scenario, one or more portions of the front sensor assembly may have a different color that the other surfaces. For instance, as shown in FIGS. 7B-7C, band 714, which is part of the lidar unit 702, may have a contrasting color different from other portions of the lidar unit, or surfaces 708 and/or 710. In one example, the band 714 may be a blue color, such as L*51.47, a*−5.95, b*−43.86 in the CIELAB color space. According to this example, these values may be higher or lower, e.g., +/−10% for any L, a or b value.

Another example of a perimeter housing assembly is shown in FIGS. 8A-D. In particular, these figures illustrate a rear perimeter assembly 800, which is shown in example positions on the rear fascia of a sedan or other vehicle in FIG. 1C (142a and 142b). In the example of FIGS. 8A-D, the assembly may be configured for placement along the left rear quarterpanel. A mirror image of this example rear perimeter assembly may be positioned along the right rear quarterpanel. By way of example, sensor 802 is a radar sensor and second sensor 804 is a camera. These sensors are able to provide information about other vehicles approaching from the rear, for example to account for high speed lane changes to the right or left.

Similar to the color arrangements described above for the roof pod assembly and side perimeter sensor assembly, different surfaces of the rear perimeter sensor assembly may have contrasting colors. For instance, as seen in view FIG. 8A, there is an outer border surface region 806, a sensor surface 808, and an inner border surface region 810 between the outer border surface region 806 and the sensor surface 808. In one example, the region 806 may have a first color (e.g., white or off-white) while the regions 808 and 810 have a contrasting color (e.g., black). In another example, both border surface regions have the same color, which may be lighter or darker than the sensor surface 808. This may be done for aesthetic reasons, such as to provide color consistency or color contrast on adjacent surfaces. As noted above, the lighter color may be on the order of L*89.08 (e.g., +/−5%), with a* being between −1.4 to −1.5 and b* being between −0.10-0.15. This can help regulate the temperature within the rear perimeter sensor assembly. And as also noted above, the darker color may be L*24.48, a*0.24, b*−0.61 or L*51.47, a*−5.95, b*−43.86 in the CIELAB color space. In this example, the cover of the radar unit, as shown by dotted line 812, may have a radar-transmissive dark paint. For instance, the paint for this cover is employed protects the mechanical property of the radar cover (e.g., formed of plastic) as well as provide a minimum loss of radar transmission. In one example, a dark (e.g., black) base radar-transparent layer may be applied directly to the cover, while a transparent glossy layer is applied over the base layer. In the parts of surface 808 outside of the radar cover, as well as the region around the camera, may have a matte black-type finish or other appearance.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A vehicle comprising:
a control system having one or more processors configured to operate the vehicle in an autonomous driving mode based on objects and conditions in an environment external to the vehicle; and
a perception system operatively coupled to the control system, the perception system being configured to detect one or more of the objects and conditions in the environment external to the vehicle, the perception system including a first sensor housing disposed along a roof of the vehicle and a second sensor housing disposed along a side quarterpanel of the vehicle,
the first sensor housing comprising:
a base section having a first side facing towards the roof of the vehicle and a second side opposite the first side;
an upper section being disposed along the second side of the base section and extending away from the roof of the vehicle, the upper section having one or more surfaces generally parallel to the second side of the base section, and one or more surfaces generally perpendicular to the second side of the base section; and
a sensor module disposed along the upper section, wherein the sensor module is configured to detect objects or environmental conditions external to the vehicle,
wherein:
the second side of the base section has a first color,
the one or more surfaces of the upper section generally parallel to the second side of the base section have the first color, and
the one or more surfaces of the upper section generally perpendicular to the second side of the base section having a second color distinct from the first color; and
the second sensor housing, the second sensor housing comprising:
a first region arranged generally parallel to a side surface of the vehicle, the first region including at least a first sensor of a first type and a second sensor of a second type;
one or more second regions generally orthogonal to the first region, the one or more second regions not including any sensors therealong; and
wherein the first region has the second color, and at least one of the one or more second regions has the first color distinct from the second color.

* * * * *